(12) United States Patent
Brueck et al.

(10) Patent No.: US 8,115,992 B2
(45) Date of Patent: Feb. 14, 2012

(54) STRUCTURAL ILLUMINATION AND EVANESCENT COUPLING FOR THE EXTENSION OF IMAGING INTERFEROMETRIC MICROSCOPY

(75) Inventors: Steven R. J. Brueck, Albuquerque, NM (US); Yulia Kuznetsova, Albuquerque, NM (US); Alexander Neumann, Albuquerque, NM (US)

(73) Assignee: STC.UNM, Alburquerque, NM (US)

( * ) Notice: Subject to any disclaimer, the term of this patent is extended or adjusted under 35 U.S.C. 154(b) by 416 days.

(21) Appl. No.: 12/347,619

(22) Filed: Dec. 31, 2008

(65) Prior Publication Data

US 2009/0310214 A1   Dec. 17, 2009

Related U.S. Application Data

(60) Provisional application No. 61/017,985, filed on Dec. 31, 2007, provisional application No. 61/089,669, filed on Aug. 18, 2008, provisional application No. 61/115,246, filed on Nov. 17, 2008.

(51) Int. Cl.
  *G02B 21/06* (2006.01)
  *G02B 21/00* (2006.01)
(52) U.S. Cl. .......................... 359/385; 359/368
(58) Field of Classification Search ........... 359/368–390
  See application file for complete search history.

(56) References Cited

U.S. PATENT DOCUMENTS

| 6,255,642 B1 * | 7/2001 | Cragg et al. | 250/216 |
| 2005/0023439 A1 * | 2/2005 | Cartlidge et al. | 250/208.1 |
| 2007/0013999 A1 * | 1/2007 | Marks et al. | 359/368 |

* cited by examiner

*Primary Examiner* — Thong Nguyen
(74) *Attorney, Agent, or Firm* — MH2 technology Law Group, LLP

(57) ABSTRACT

In accordance with the invention, there are imaging interferometric microscopes and methods for imaging interferometric microscopy using structural illumination and evanescent coupling for the extension of imaging interferometric microscopy. Furthermore, there are coherent anti-Stokes Raman (CARS) microscopes and methods for coherent anti-Stokes Raman (CARS) microscopy, wherein imaging interferometric microscopy techniques are applied to get material dependent spectroscopic information.

58 Claims, 21 Drawing Sheets

On axis coherent illumination

Off axis illumination (x-direction)

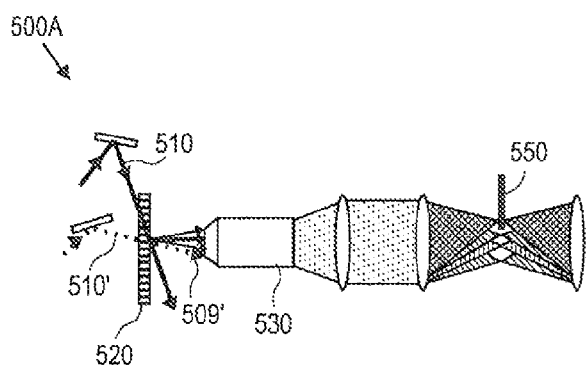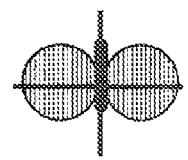
FIG. 5A
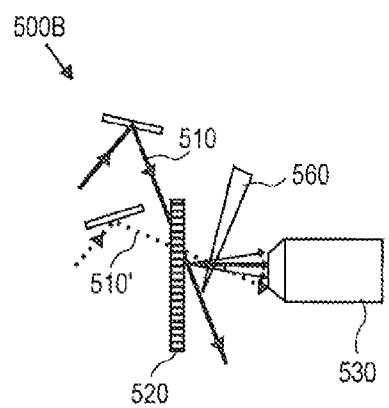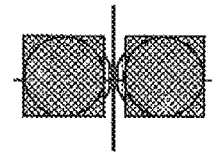
FIG. 5B

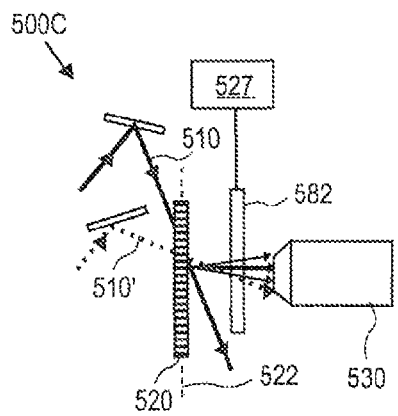
FIG. 5C
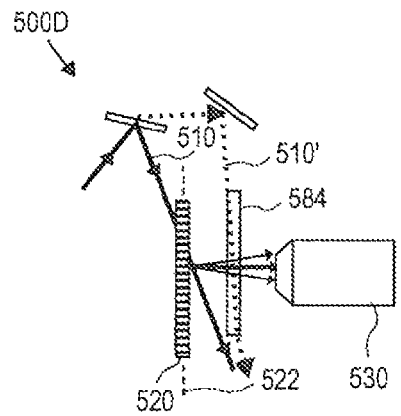
FIG. 5D
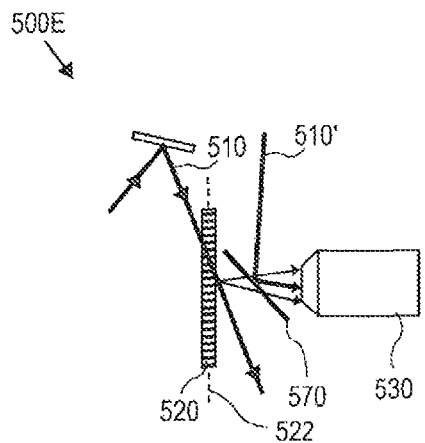
FIG. 5E
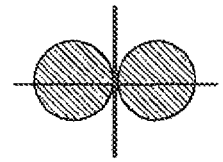

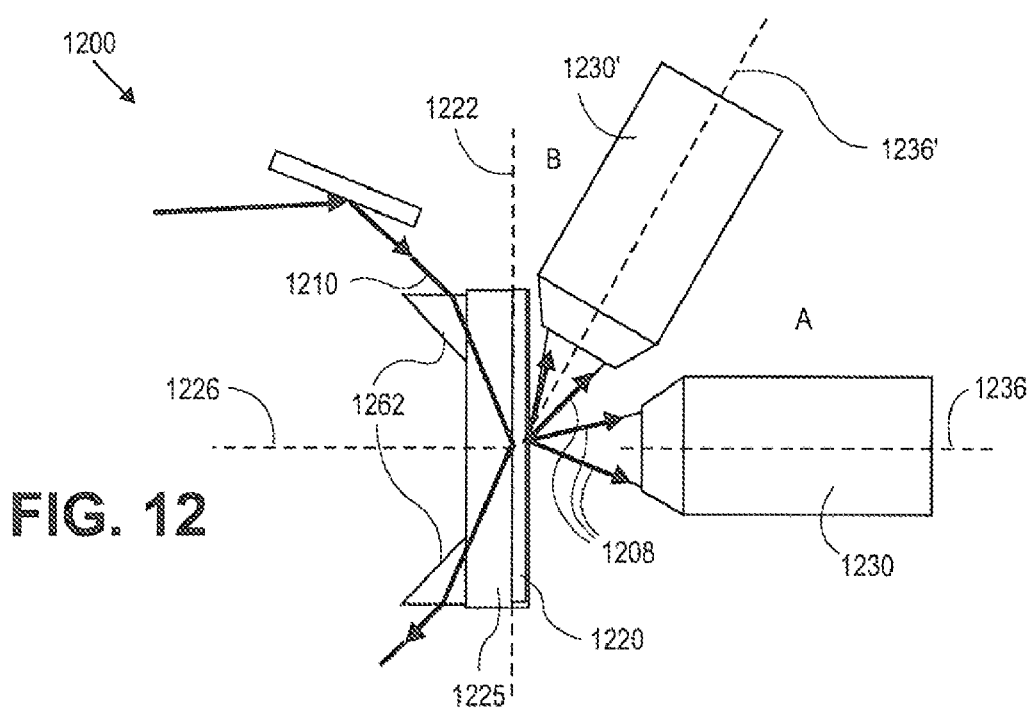

FIG. 15A
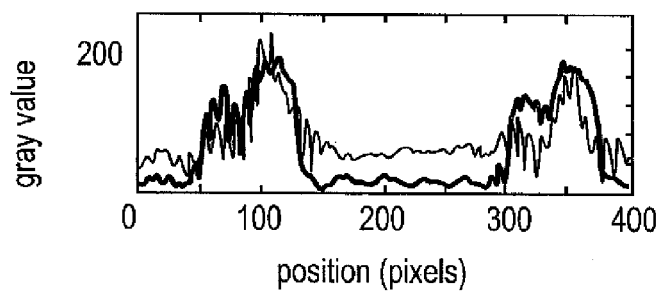
FIG. 15B
FIG. 16A FIG. 16B FIG. 16C
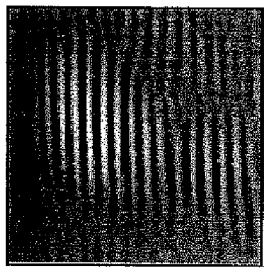 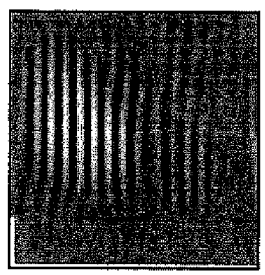 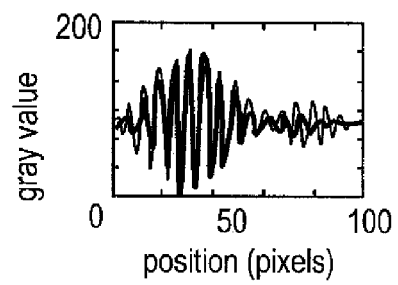
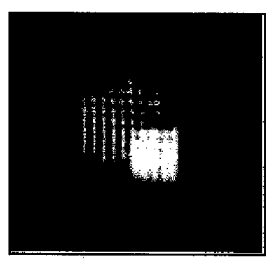 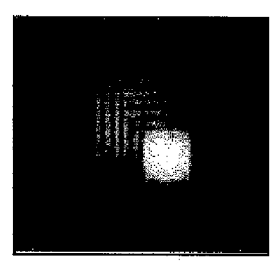 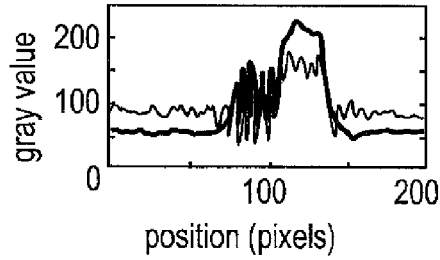
FIG. 16D FIG. 16E FIG. 16F

STRUCTURAL ILLUMINATION AND EVANESCENT COUPLING FOR THE EXTENSION OF IMAGING INTERFEROMETRIC MICROSCOPY

RELATED APPLICATIONS

This application claims priority from U.S. Provisional Patent Application Ser. Nos. 61/017,985, filed Dec. 31, 2007; 61/089,669, filed Aug. 18, 2008; and 61/115,246, filed Nov. 17, 2008, which are hereby incorporated by reference in their entirety.

GOVERNMENT RIGHTS

This invention was made with government support under Contract Nos. HR0011-1-0006 awarded by the Defense Advanced Research Projects Agency and FA9550-06-1-0001 awarded by the Air Force Office of Scientific Research. The government has certain rights in the invention.

FIELD OF THE INVENTION

This invention relates generally to microscopy, and, more particularly, to an imaging interferometric microscope; coherent anti-Stokes Raman (CARS) microscope; methods for applying the imaging interferometric microscopy to coherent anti-Stokes Raman (CARS) microscopy; methods to simplify the approaches to imaging interferometric microscopy that require less, or no, access to the optical path after the objective lens and so can be applied to existing microscopes; and for providing an optical resolution up to about $\lambda\backslash 4n$, where n is the substrate refractive index and $\lambda$ is an optical wavelength.

BACKGROUND OF THE INVENTION

Optical microscopy is among the oldest applications of optical science and remains one of the most widely used optical technologies. In spite of impressive results obtained by fluorescent microscopy in exceeding the classical diffraction limit, non-fluorescent transmission/reflection microscopy remains an important field of modern research. However, using traditional illumination schemes, resolution is limited to $\sim \kappa_1 \lambda /NA$ where $\lambda$ is the source wavelength and NA is the numerical aperture (sine of the half-acceptance angle) of the imaging objective lens. The "constant" $\kappa_1$ depends on both the details of the image and on the illumination scheme. Hence, traditional approaches to improve resolution are either to use shorter wavelengths and/or to use larger numerical-aperture lenses. For biological samples, however, the wavelength is constrained to the visible spectral range because ultraviolet photons can damage samples. In many practical cases, even for inorganic samples, the wavelength is limited to the deep ultraviolet (for example 193 nm) since transmissive optical materials become difficult at shorter wavelengths (fused quartz has a cutoff at ~185 nm). Furthermore, a disadvantage of using a high-NA lens is the resulting short depth-of-field (an essential feature of achieving high resolution in a single image; typically the depth-of-field scales as $\kappa_2 \lambda /NA^2$ where $\kappa_2$ is a second "constant" of order unity). The depth-of-field decreases rapidly as the NA is increased to increase the resolution. In addition, the field of view (the area over which the resolution is achieved) and the working distance (the distance from the final lens surface to the object plane) are reduced for higher-NA optical systems. These latter two issues can be surmounted by more complex objective lenses, with an increase in the cost of manufacturing. These tradeoffs are well known and are discussed in many microscopy overviews.

Synthetic aperture approaches, such as, for example, imaging interferometric microscopy (IIM) extend the collected spatial frequencies to improve the image. IIM uses a low-NA objective and yet provides a resolution approximately a factor of two better than that available even with a high-NA objective using conventional coherent or incoherent illumination. A major advantage is that the depth-of-field, field-of-view and working distance associated with the low-NA system are retained, but the final composite image has a resolution at the linear system limit imposed by the transmission medium ($\geq \lambda /4$ where $\lambda$ is the wavelength in the transmission medium), and significantly better than that accessible with even a high NA lens using conventional (coherent or incoherent) illumination approaches. As is well-known, using off-axis illumination provides enhanced resolution over that available with either of the standard illumination schemes discussed above, but there is some distortion of the image associated with the resultant non-constant transfer function for different regions of frequency space. This non-uniform frequency-space coverage can be addressed with appropriate pupil plane filters and by combining partial images corresponding to different parts of frequency space, as has been previously demonstrated in the case of imaging interferometric lithography.

An exemplary IIM with two offset partial images, one each in orthogonal spatial directions can result in an increased resolution by three times using about 0.4-NA objective and 633-nm He—Ne laser. Furthermore, IIM requires building an interferometric system around the objective lens which is an issue for wide-spread adoption of this approach, and in particular towards its adoption to the existing microscopes. In the prior art, this interferometer required additional optics to relay the pupil plane of the collection objective to convenient location; this is straightforward but required significant additional optics. Hence, there is a need for a new approach that does not require a large change to the imaging optical system that comprises the objective lens and subsequent optical components.

The prior art imaging interferometric microscopy was able to image maximum spatial frequency of $2\pi/\lambda$ e.g. to the linear system's limit of the air (transmission medium between the object and the lens). The ultimate linear system's limit is $2\pi n/\lambda$, which reflects the use of an immersion medium of refractive index n. Even though materials with refractive indices of upto about 3.3 are known at some optical wavelengths, the highest numerical aperture available for the immersion microscopy is about 1.4, limited by the refractive index of the glass used to make the lens, by the refractive indices available for the index matching fluids, and the well known difficulties of making aberration corrected optics of high NA. Hence, there is a need for a new approach that can achieve this linear system's limit without requiring high index matching fluids or high NA lenses.

SUMMARY OF THE INVENTION

In accordance with various embodiments, there is an apparatus for microscopy including an object plane on which can be disposed a first surface of a substrate, wherein the substrate is characterized by a homogeneous refractive index ($n_{sub}$) and a surface normal. The apparatus can also include a first optical system disposed to provide a substantially coherent illumination of the object plane, the illumination characterized by a wavelength λ and a radius of curvature and disposed at one of a plurality of incident wave vectors from about 0 to about $2\pi/\lambda$ with respect to a surface normal of the substrate and at a plurality of azimuth angles spanning 0 to $2\pi$. The apparatus can further include a second optical system disposed to collect portions of the illumination scattered from the object plane, the second optical system having an optical axis disposed at one of a plurality of center wave vectors from about 0 to about $2\pi/\lambda$ with respect to the substrate surface normal and at the azimuth angle corresponding to the illumination of the first optical system, wherein the second optical system is characterized by a numerical aperture (NA). The apparatus can also include a third optical system disposed between the optical path of the first optical system and an entrance aperture of the first optical element of the second optical system to provide interferometric reintroduction of a portion of the coherent illumination (reference beam) into the second optical system, wherein each of an amplitude, a phase, a radius of curvature, and an angle of incidence of the reference beam is adjusted such that a corrected reference beam is present at the image plane of the second optical system. The apparatus can further include an electronic image device disposed at an image plane of the second optical system that responds linearly to the local optical intensity and transfers the local optical intensity map across the image plane (a sub-image) to a signal processor device in electronic form, a device for adjusting the first, the second, and the third optical systems to collect sub-images for different pairs of the pluralities of incident (first optical system) and collection center (second optical system) wave vectors so as to sequentially obtain a plurality of sub-images corresponding to a plurality of regions of spatial frequency space, and an electronic device to sequentially receive the electronic form of the sub-images and manipulate the sub-images to correct for distortions and alterations introduced by the optical configuration, store, and combine the plurality of sub-images corresponding to the plurality of regions of spatial frequency space to create a composite image.

According to another embodiment, there is a method for microscopy including providing an object disposed over a planar substrate, wherein the substrate is characterized by a homogeneous refractive index ($n_{sub}$) and a surface normal. The method can also include providing a first optical system to illuminate the object with substantially coherent illumination, the illumination characterized by a wavelength λ and a radius of curvature and disposed at one of a plurality of incident wave vectors from about 0 to about $2\pi/\lambda$ with respect to a surface normal of the substrate and at a plurality of azimuth angles spanning from about 0 to about $2\pi$. The method for microscopy can further include providing a second optical system disposed to collect portions of the illumination scattered from the object plane, the second optical system having an optical axis disposed at one of a plurality of center wave vectors from about 0 to about $2\pi/\lambda$ with respect to the substrate surface normal and at the azimuth angle corresponding to the illumination of the first optical system, wherein the second optical system is characterized by a numerical aperture (NA). The method for microscopy can also include providing a third optical system disposed between the optical path of the first optical system and an entrance aperture of the first optical element of the second optical system to provide interferometric reintroduction of a portion of the coherent illumination (reference beam) into the second optical system, wherein each of an amplitude, a phase, a radius of curvature and an angle of incidence of the reference is adjusted as required such that a corrected reference wave is present at the image plane of the second optical system. The method for microscopy can also include recording a sub-image of the object at an object plane using an electronic image device, wherein the sub-image is formed as a result of interference between the scattering resulting from the coherent illumination of the object and the reference beam, adjusting the first, the second, and the third optical systems to sequentially collect a plurality of sub-images corresponding to a plurality of regions of spatial frequency space, manipulating each of the plurality of sub-images using a signal processor to correct for distortions and alterations introduced by the optical configuration, and combining the plurality of sub-images into a composite image to provide a substantially faithful image of the object.

According to another embodiment, there is an apparatus for microscopy including an object plane on which can be disposed a first surface of a substrate, wherein the substrate is characterized by a homogeneous refractive index ($n_{sub}$) and a surface normal. The apparatus for microscopy can also include a first optical system disposed to provide an evanescent wave illumination of the object plane by providing a substantially coherent illumination of the object plane, the illumination characterized by a wavelength λ and a radius of curvature and disposed at one of a plurality of incident wave vectors from about $2\pi/\lambda$ to about $2\pi n_{sub}/\lambda$ with respect to a surface normal of the substrate and at a multiplicity of azimuth angles spanning 0 to $2\pi$, wherein the plurality of incident wave vectors correspond to angles beyond a total internal reflection angle $\theta_c$ of the substrate. The apparatus for microscopy can further include a second optical system disposed to collect portions of the illumination scattered from the object plane, the second optical system having an optical axis disposed at one of a plurality of center wave vectors from about 0 to about $2\pi/\lambda$, with respect to the substrate surface normal and at the azimuth angle corresponding to the illumination of the first optical system, wherein the second optical system is characterized by a numerical aperture (NA). The apparatus for microscopy can also include a third optical system disposed in an optical path of the first optical system to provide interferometric reintroduction of a portion of the coherent illumination (reference beam) into the second optical system, wherein each of an amplitude, a phase, a radius of curvature and an angle of incidence of the reference is adjusted as required such that a corrected reference wave is present at the image plane of the second optical system. The apparatus for microscopy can further include an electronic image device disposed at an image plane of the second optical system that responds linearly to the local optical intensity and transfers the local optical intensity map across the image plane (a sub-image) to a signal processor device in electronic form, a device for adjusting the first, the second, and the third optical systems to collect sub-images for different pairs of the pluralities of incident (first optical system) and collection center (second optical system) wave vectors so as to sequentially obtain a plurality of sub-images corresponding to a plurality of regions of spatial frequency space, and an electronic device to sequentially receive the electronic form of the sub-images and manipulate the sub-images to correct for distortions and alterations introduced by the optical configuration, store, and combine the plurality of sub-images corresponding to the plurality of regions of spatial frequency space to create a composite image.

According to yet another embodiment, there is a method for microscopy including providing an object disposed over a surface of a planar substrate characterized by a homogeneous refractive index ($n_{sub}$) and a surface normal. The method for microscopy can also include providing a first optical system disposed to provide an evanescent wave illumination of the object plane by providing a substantially coherent illumination of the object plane, the illumination characterized by a wavelength $\lambda$ and a radius of curvature and disposed at one of a plurality of incident wave vectors from about $\lambda$ to about $2\pi n_{sub}/\lambda$ with respect to a surface normal of the substrate and at a multiplicity of azimuth angles spanning 0 to $2\pi$, wherein the plurality of incident wave vectors correspond to angles beyond a total internal reflection angle $\theta_c$ of the substrate. The method for microscopy can further include providing a second optical system having an optical axis disposed at one of a plurality of center wave vectors from about 0 to about $2\pi/\lambda$ with respect to the surface normal, wherein the second optical system is characterized by a numerical aperture (NA) and providing a third optical system disposed in an optical path of the first optical system to provide interferometric reintroduction of a portion of the coherent plane wave illumination (reference beam) into the second optical system, wherein the amplitude, phase, and position of the reintroduced illumination plane wave in the back focal plane of the second optical system is adjusted as required. The method for microscopy can also include recording a sub-image of the object at an object plane using an electronic image device, wherein the sub-image is formed as a result of interference of the coherent plane wave illumination of the object and the reference beam, adjusting the first, the second, and the third optical systems to sequentially collect a plurality of sub-images corresponding to a plurality of regions of spatial frequency space, manipulating each of the plurality of sub-images using a signal processor to correct for distortions and alterations introduced by the optical configuration, and combining the plurality of sub-images into a composite image to provide a substantially faithful image of the object.

In accordance with another embodiment, there is an apparatus for microscopy including an object plane on which can be disposed a first surface of a planar substrate, wherein the substrate is characterized by a homogeneous refractive index ($n_{sub}$) and a surface normal. The apparatus can also include a first optical system disposed to provide a substantially coherent illumination of the object plane, the illumination characterized by a wavelength $\lambda$ and a radius of curvature and disposed at one of a plurality of incident wave vectors from about 0 to about $2\pi n_{sub}/\lambda$ with respect to a surface normal of the substrate and at a plurality of azimuth angles spanning 0 to $2\pi$. The apparatus can further include at least one grating on the side of the substrate opposite the object plane, each grating characterized by a period, a depth, a grating profile and a position to further scatter reflected waves resulting from the coherent illumination of the object plane into propagating waves in the medium below the substrate and a second optical system having an optical axis disposed at one of a plurality of center wave vectors from about 0 to about $2\pi/\lambda$ with respect to the surface normal, wherein the second optical system can include the gratings on the second side of the substrate and is characterized by a numerical aperture (NA). The apparatus for microscopy can also include a third optical system disposed in an optical path of the first optical system to provide interferometric reintroduction of a portion of the coherent illumination (reference beam) into the second optical system, wherein each of an amplitude, a phase, a radius of curvature and an angle of incidence of the reference is adjusted as required such that a corrected reference wave is present at the image plane of the second optical system. The apparatus for microscopy can further include an electronic image device disposed at an image plane of the second optical system that responds linearly to the local optical intensity and transfers the local optical intensity map across the image plane (a sub-image) to a signal processor device in electronic form, a device for adjusting the first, the second, and the third optical systems to collect sub-images for different pairs of the pluralities of incident (first optical system) and collection center (second optical system) wave vectors so as to sequentially obtain a plurality of sub-images corresponding to a plurality of regions of spatial frequency space, and an electronic device to sequentially receive the electronic form of the sub-images and manipulate the sub-images to correct for distortions and alterations introduced by the optical configuration, store, and combine the plurality of sub-images corresponding to the plurality of regions of spatial frequency space to create a composite image.

In accordance with yet another embodiment, there is a method for microscopy including providing an object disposed over a first side of a planar substrate, the substrate characterized by a homogeneous refractive index ($n_{sub}$) and a surface normal such that the object is separated from the substrate by a distance of about $\leq \lambda$ and providing at least one grating on a second side of the substrate opposite the first side, each grating characterized by a position, a period, a depth, and a grating profile, wherein the at least grating further scatters reflected waves resulting from the coherent illumination of the object into propagating waves in the medium below the substrate. The method for microscopy can also include providing a first optical system disposed to provide a substantially coherent illumination of the object plane, the illumination characterized by a wavelength $\lambda$ and a radius of curvature and disposed at one of a plurality of incident wave vectors from about 0 to about $2\pi n_{sub}/\lambda$ with respect to a surface normal of the substrate and at a plurality of azimuth angles spanning about 0 to about $2\pi$ and providing a second optical system having an optical axis disposed at one of a plurality of center wave vectors from about 0 to about $2\pi/\lambda$ with respect to the surface normal, wherein the second optical system can include the at least one grating on the second side of the substrate and is characterized by a numerical aperture (NA). The method for microscopy can further include providing a third optical system disposed in an optical path of the first optical system to provide interferometric reintroduction of a portion of the coherent illumination (reference beam) into the second optical system, wherein each of an amplitude, a phase, a radius of curvature and an angle of incidence of the reference is adjusted as required such that a corrected reference wave is present at the image plane of the second optical system and recording a sub-image of the object at an object plane using an electronic image device, wherein the sub-image is formed as a result of interference between the scattering resulting from the coherent illumination of the object and the reference beam. The method for microscopy can also include adjusting the first, the second, and the third optical systems to sequentially collect a plurality of sub-images corresponding to a plurality of regions of spatial frequency space, manipulating each of the plurality of sub-images using a signal processor to correct for distortions and alterations introduced by the optical configuration, and combining the plurality of sub-images into a composite image to provide a substantially faithful image of the object.

According to various embodiments, there is an apparatus for coherent anti-Stokes Raman (CARS) microscopy including an object plane on which can be disposed a first surface of a planar substrate, wherein the substrate is characterized by a homogeneous refractive index ($n_{sub}$) and a surface normal. The apparatus for CARS microscopy can include a first optical system disposed to provide a illumination of the object plane, the illumination characterized by two substantially coincident coherent beams with wavelengths $\lambda 1$ and $\lambda 2$ and corresponding angular frequencies $\omega 1$ and $\omega 2$ with $\omega 1 > \omega 2$, a radius of curvature, and disposed at one of a plurality of incident wave vectors from about 0 to about $2\pi n_{sub}/\lambda_1$ with respect to a surface normal of the substrate and at a plurality of azimuth angles spanning about 0 to about $2\pi$ and a second optical system (collection) having an optical axis disposed at one of a plurality of center wave vectors from about 0 to about $2\pi n_{sub}/\lambda_1$ with respect to the surface normal, wherein the second optical system is characterized by a numerical aperture (NA) and is responsive primarily to optical signals at frequencies greater than $\omega_1$. The apparatus for CARS microscopy can also include a third optical system disposed in an optical path of the first optical system to provide interferometric reintroduction of a reference illumination (reference beam) at a frequency of $2\omega_1 - \omega_2$, into the second optical system, wherein each of an amplitude, a phase, a radius of curvature and an angle of incidence of the reference is adjusted as required such that a corrected reference wave is present at the image plane of the second optical system and an electronic image device disposed at an image plane of the second optical system that responds linearly to the local optical intensity and transfers the local optical intensity map across the image plane (a sub-image) to a signal processor device in electronic form. The apparatus for CARS microscopy can further include a device for adjusting the first, the second, and the third optical systems to collect sub-images for different pairs of the pluralities of incident (first optical system) and collection center (second optical system) wave vectors so as to sequentially obtain a plurality of sub-images corresponding to a plurality of regions of spatial frequency space and an electronic device to sequentially receive the electronic form of the sub-images and manipulate the sub-images to correct for distortions and alterations introduced by the optical configuration, store, and combine the plurality of sub-images corresponding to the plurality of regions of spatial frequency space to create a composite image.

According to another embodiment, there is a method for coherent anti-Stokes Raman (CARS) microscopy including providing an object atop an object plane disposed upon a planar substrate, wherein the substrate is characterized by a homogeneous refractive index ($n_{sub}$) and a surface normal. The method for CARS microscopy can include providing a first optical system disposed to provide a illumination of the object plane, the illumination characterized by two substantially coincident coherent beams with wavelengths $\lambda_1$ and $\lambda_2$ and corresponding angular frequencies $\omega_1$ and $\omega_2$ with $\omega_1 > \omega_2$, a radius of curvature, and disposed at one of a plurality of incident wave vectors from about 0 to about $2\pi n_{sub}/\lambda_1$ with respect to a surface normal of the substrate and at a multiplicity of azimuth angles spanning 0 to $2\pi$ and providing a second optical system (collection) having an optical axis disposed at one of a plurality of center wave vectors from about 0 to about $2\pi n_{sub}/\lambda_1$ with respect to the surface normal, wherein the second optical system is characterized by a numerical aperture (NA) and is responsive primarily to optical signals at frequencies greater than $\omega_1$. The method for CARS microscopy can further include providing a third optical system disposed in an optical path of the first optical system to provide interferometric reintroduction of a reference illumination (reference beam) at a frequency of $2\omega_1 - \omega_2$, into the second optical system, wherein each of an amplitude, a phase, a radius of curvature and an angle of incidence of the reference is adjusted as required such that a corrected reference wave is present at the image plane of the second optical system and recording a sub-image of the object at an object plane using an electronic image device, wherein the sub-image is formed as a result of interference between the scattering resulting from the coherent illumination of the object and the reference beam. The method for CARS microscopy can also include adjusting the first, the second, and the third optical systems to sequentially collect a plurality of sub-images corresponding to a plurality of regions of spatial frequency space, manipulating each of the plurality of sub-images using a signal processor to correct for distortions and alterations introduced by the optical configuration, and combining the plurality of sub-images into a composite image to provide a substantially faithful image of the object.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 5A is a schematic illustration showing a dynamic physical block in a back pupil plane of the second optical system to alternately block and unblock the reference beam, according to present teachings.

FIG. 5B is a schematic illustration showing injection of the reference beam into a second optical system using a prism, according to present teachings.

FIG. 5C is a schematic illustration of injection of the reference beam into a second optical system using a beamsplitter, according to present teachings.

FIG. 5D is a schematic illustration showing blocking of the reference beam with a k-vector filter, according to present teachings.

FIG. 5E is a schematic illustration showing injection of the reference beam with a grating, according to present teachings.

FIG. 12A shows an exemplary IIM arrangement with evanescent illumination, according to various embodiments of the present teachings.

FIG. 12B shows an exemplary IIM arrangement with evanescent illumination with a rotated optical axis, according to various embodiments of the present teachings.

FIG. 15A show reconstructed image of 260 nm and 240 nm CD structures obtained using the optical arrangement shown in FIG. 12A.

FIG. 15B show a crosscut (gray) of the images of FIG. 15A compared with a crosscut of corresponding simulation (black).

FIG. 16A shows a reconstructed high frequency image of a 150 nm structure using evanescent illumination and a tilted optical system, shown in FIG. 12B.

FIG. 16B shows a high frequency image simulation of a 150 nm structure using evanescent illumination and a tilted optical system, shown in FIG. 12B.

FIG. 16C shows experimental and simulation cross-cuts of images shown in FIGS. 16A and 16B.

FIG. 16D shows a reconstructed composite image of a 150 nm structure using evanescent illumination and a tilted optical system, shown in FIG. 12B FIG. 16E shows a composite image simulation of a 150 nm structure using evanescent illumination and a tilted optical system, shown in FIG. 12B.

FIG. 16F shows experimental and simulation cross-cuts of images shown in FIGS. 16D and 16E.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
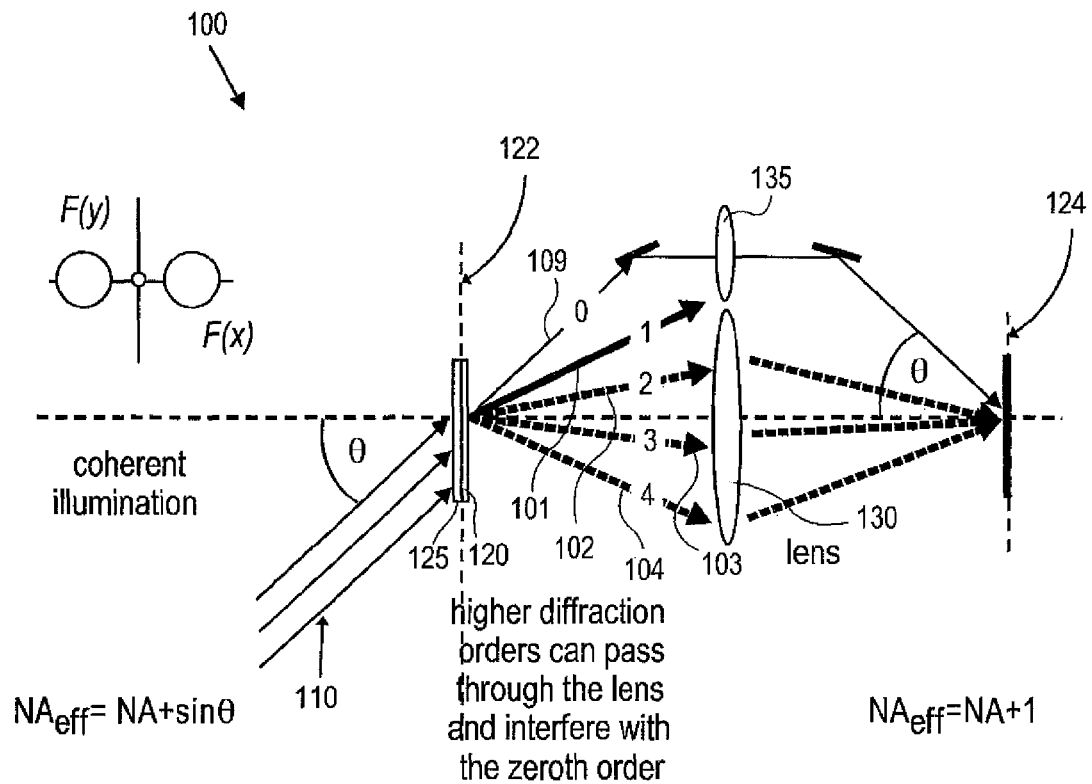
FIG. 1 shows an exemplary prior art imaging interferometric microscopy (IIM) experimental arrangement.
Figure 2A:
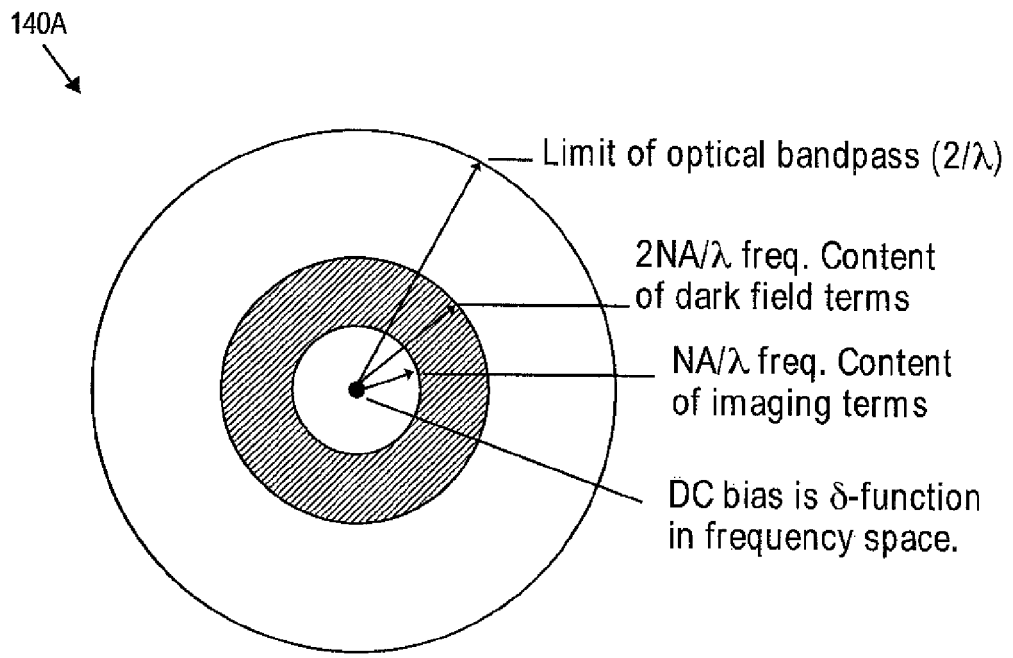
FIG. 2A shows the frequency space coverage for conventional normal incidence coherent illumination.
Figure 2B:
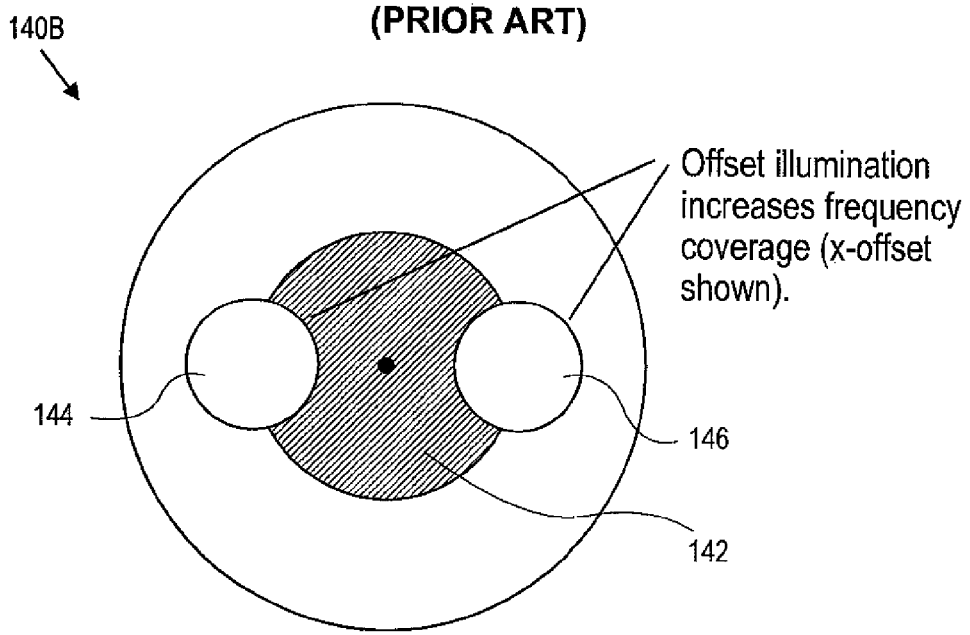
FIG. 2B shows the frequency space coverage for an off-axis incidence coherent illumination.

FIG. 1 shows a prior art imaging interferometric microscopy (IIM) arrangement 100. As shown in FIG. 1, a collimated (equivalent to coherent) illumination beam 110 is incident on an object 120 at an angle of incidence θ. In the illustrated case, θ is beyond the collection angle of the objective lens 130 and an auxiliary optical system 135 is shown schematically to collect the zero-order transmission 109, appropriately adjust its divergence, direction, and phase and re-inject it onto the image plane 124 where it interferes with the diffracted beams 101, 102, 103, 104 from the object 120 to construct a partial image. Alternatively, instead of using the zero-order transmission 109, which might be blocked by the objective-lens 130 mount, a portion of the illumination beam 110 can be split off before the object 120 and directed around the objective lens 130. The interference between the zero-order beam 109 and the diffracted beams 101, 102, 103, 104 transmitted through the objective lens 130 can shift the collected diffracted information back to high frequency. As a result of the square-law intensity response, the resulting frequency coverage 140B can be represented by a pair of circles 144, 146 of radius NA/λ shifted away from zero frequency 142 by $2(2\pi)NA/\lambda$ as shown in FIG. 2B. FIG. 2B shows the frequency space coverage 140B for off-axis coherent illumination, where frequencies beyond the lens bandpass are recorded in the sub-image as a result of the interferometric reconstruction. For comparison, FIG. 2A shows the frequency space coverage 140A for conventional normal incidence on-axis coherent illumination.

An object of the present teachings is to reduce or eliminate the requirement of the prior art for optical access to between the back of the objective lens and the image plane of the second optical system. This access is required for injecting the reference beam 109 in the prior art (FIG. 1). However, in many existing optical microscopes, this region is inaccessible. The structured illumination approach disclosed herein provides alternative methods of injecting the reference beam in front of the objective lens of the second optical system, thereby simplifying the application of imaging interferometric microscopy to existing optical microscopy systems. Since both the diffracted beams and the reference beams are not transmitted through the same objective, characterized by an NA, the high frequency image components are necessarily shifted to lower frequency. This is similar to the use of an intermediate frequency in heterodyne radio receivers, but in the spatial frequency rather than the temporal frequency domain. It is necessary to reset the spatial frequencies by signal processing after each sub-image is captured in the electronic recording device. Additional advantages of this approach are that the pixel count requirements in the image plane are reduced, since only lower spatial frequencies, up to $2(2\pi)NA/\lambda$, are recorded, and the interferometer can be made smaller since all of the components are on the front side of the objective lens, reducing vibrational effects on the interferometric reconstruction.

Figure 3:
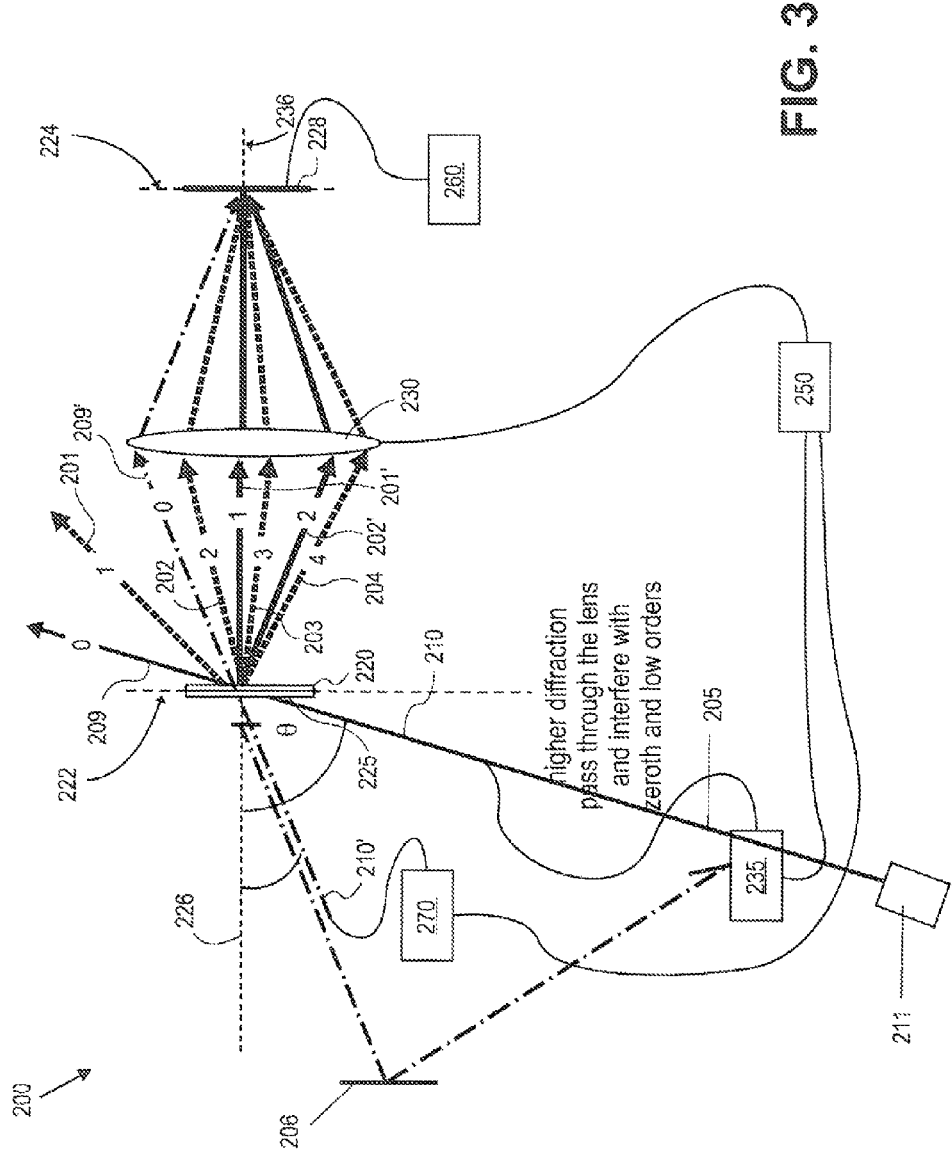
FIG. 3 shows an exemplary structured illumination approach to IIM, according to various embodiments of the present teachings.

FIG. 3 shows an optical arrangement of the apparatus 200 for an exemplary structured illumination approach to IIM, according to various embodiments of the present teachings. The apparatus 200 can include an object 220 disposed on an object plane 222 on which a first surface of a substrate 225 can be disposed, wherein the substrate 225 can be characterized by a homogeneous refractive index ($n_{sub}$) and a surface normal 226. The apparatus 200 can also include a first optical system including a source 211 and one or more optical components (not shown) disposed to provide a substantially coherent illumination 210 of the object plane 222, the illumination 210 characterized by a wavelength $\lambda$ and a radius of curvature and disposed at one of a plurality of incident wave vectors from about 0 to about $2\pi/\lambda$ with respect to a surface normal of the substrate and at a plurality of azimuth angles spanning 0 to $2\pi$. Illumination 210 is diffracted by object 221 into a central, undiffracted $0^{th}$ order 209 and higher diffraction orders including a $1^{st}$ order 201, a $2^{nd}$ order 202, a $3^{rd}$ order 203 and a $4^{th}$ order 204. Each of these orders corresponds to a different spatial frequency component of the object, with smaller spatial frequencies corresponding to higher diffraction angles (orders). The apparatus 200 can also include a second optical system 230 disposed to collect portions of the illumination beam scattered from the object plane 222, the second optical system having an optical axis 236 disposed at one of a plurality of center wave vectors from about 0 to about $2\pi/\lambda$ with respect to the substrate surface normal 226 and at the azimuth angle corresponding to the illumination of the first optical system, wherein the second optical system 230 is characterized by a numerical aperture (NA). In various embodiments, the second optical system 230 can include at least one objective lens. The apparatus 200 can also include a third optical system represented by beamsplitter 205 and mirror 206 disposed between the optical path of the first optical system and an entrance aperture of the second optical system to provide interferometric reintroduction of a portion of the coherent illumination (reference beam) 210' into the second optical system 230, wherein each of an amplitude, a phase, a radius of curvature, a path length and an angle of incidence of the reference beam can be adjusted such that a correct reference beam can be present at a image plane 224 of the second optical system 230. It is understood that additional optical components not shown are necessary to achieve this correct reference beam. The reference beam 210' is obtained by splitting off a portion of the illumination beam 210 with beamsplitter 205 and redirecting the split-off beam with optical system 206 and the apparatus 200 is configured so that the total path lengths of the illumination beam 210 and the reference beam 210' from the beam splitter to the image plane 224 are within the temporal coherence length of the source to insure interferometric reconstruction of the sub-image. Illumination 210' is diffracted by substrate 225 into a central, undiffracted $0^{th}$ order 209' and higher diffraction orders including a $1^{st}$ order 201' and a $2^{nd}$ order 202'. The apparatus can also include an electronic image device 228 disposed at the image plane 224 of the second optical system 230 that responds linearly to the local optical intensity and transfers the local optical intensity map across the image plane (a sub-image) to a signal processor device 260 in electronic form. In various embodiments, the electronic image device 228 can be a charged coupled device (CCD) camera, a CMOS (complementary metal-oxide semiconductor) camera, and any similar electronic focal plane array device. The apparatus 200 can further include a device 250 for adjusting the first, the second, and the third optical systems to collect sub-images for different pairs of the pluralities of incident (first optical system) and collection center (second optical system) wave vectors so as to sequentially obtain a plurality of sub-images corresponding to a plurality of regions of spatial frequency space. In various embodiments, the device can block/unblock various beams, rotate substrate etc. In some embodiments, the device can include mechanical components, such as, for example, motors. In other embodiments, the device can include electronic components, such as, for example, acoustic modulators or similar devices. The signal processor device 260 can also be arranged to sequentially receive the electronic form of the sub-images and manipulate the sub-images to correct for distortions and alterations introduced by the optical configuration, store, and combine the plurality of sub-images corresponding to the plurality of regions of spatial frequency space to create a composite image. In some other embodiments, the signal processor device can include one or more computers. In some embodiments, the first, the second, and the third optical systems can be arranged in a transmission configuration with respect to the substrate surface. In other embodiments, the first, the second, and the third optical systems can be arranged in a reflection configuration with respect to the substrate surface. Items 250, 235 and 270 represent means to alter the various optical systems to correspond to different angles of incidence and scattering as described below.

In certain embodiments apparatus 200 for an exemplary structured illumination approach to IIM can also include at least one known reference object to cover a small part of the image field.

According to various embodiments, there is a method for structural imaging interferometric microscopy. The method can include providing an object 220 disposed over a planar substrate 225, wherein the substrate 225 is characterized by a homogeneous refractive index ($n_{sub}$) and a surface normal 226 and providing a first optical system to illuminate the object 220 with substantially coherent illumination 210, the illumination characterized by a wavelength λ and a radius of curvature and disposed at one of a plurality of incident wave vectors from about 0 to about 2π/λ with respect to a surface normal of the substrate and at a multiplicity of azimuth angles spanning from about 0 to about 2λ. The method can also include providing a second optical system 230 disposed to collect portions of the illumination scattered from the object plane 222, the second optical system 230 having an optical axis 236 disposed at one of a plurality of center wave vectors from about 0 to about 2π/λ with respect to the substrate 225 surface normal 226 and at the azimuth angle corresponding to the illumination of the first optical system, wherein the second optical system 230 is disposed such that the object 220 is substantially at the object plane 222 of the second optical system 230 which is characterized by a numerical aperture (NA). The method can further include providing a third optical system disposed between the optical path of the first optical system and an entrance aperture of the second optical system to provide interferometric reintroduction of a portion of the coherent illumination (reference beam) 210' into the second optical system, wherein each of an amplitude, a phase, a radius of curvature and an angle of incidence of the reference can be adjusted such that a corrected reference wave is present at the image plane of the second optical system, wherein the corrected reference beam 210' and the illumination beam 210 are within the temporal coherence length of the source. The method can also include recording a sub-image of the object 220 at an object plane 222 using an electronic image device 228, wherein the sub-image is formed as a result of interference between the scattering resulting from the coherent illumination of the object 220 and the reference beam 210'. The method can also include adjusting the first, the second, and the third optical systems to sequentially collect a plurality of sub-images corresponding to a plurality of regions of spatial frequency space, manipulating each of the plurality of sub-images using a signal processor to correct for distortions and alterations introduced by the optical configuration, and combining the plurality of sub-images into a composite image to provide a substantially faithful image of the object 220. In various embodiments, the method can further include one or more processes of subtraction of dark field images, subtraction of background images, shifting of spatial frequencies in accordance with the optical configuration, and elimination of one or more overlapping coverages of the frequency space wherein the elimination operations can be performed either in the optical systems or in the signal processing. In some embodiments, the method can also include selecting the regions of spatial frequency space to provide a more or less faithful image of the object 220 in the object plane 222. One of ordinary skill in the art would know that the regions of frequency space that are important vary depending on the object. For example for a Manhattan geometry pattern, there is less need to gather spectral information on the diagonals. See, for example, Neumann et al. in Optics Express, Vol. 16, No. 10, 2008 pp 6785-6793 which describes a structural illumination for the extension of imaging interferometric microscopy, the disclosure of which is incorporated by reference herein in its entirety.

Figure 4:
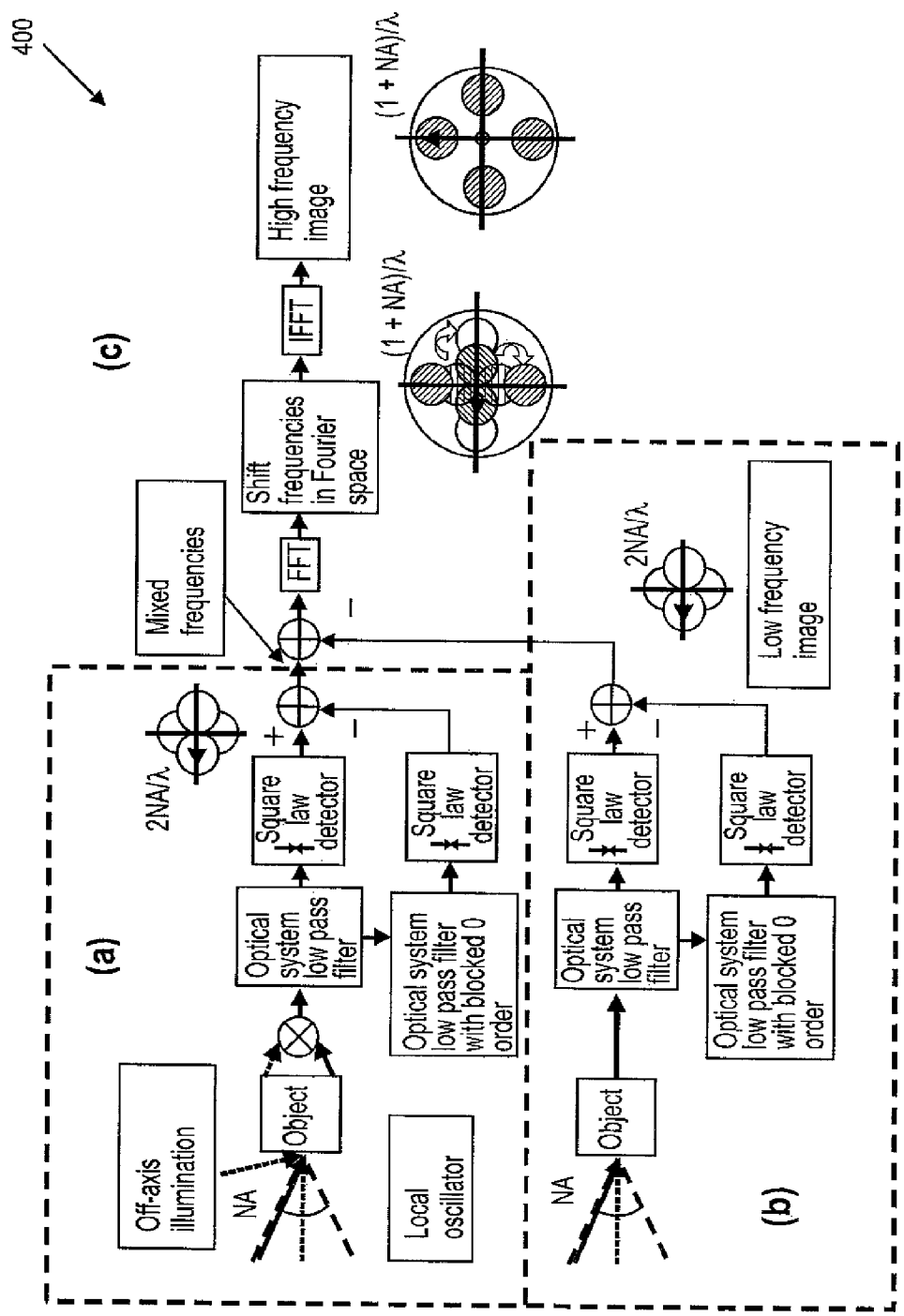
FIG. 4 shows the schematic of structural illumination and restoration algorithms, in accordance with the present teachings.

FIG. 4 shows a flow diagram schematic, indicated generally by 400(a), (b) and (c), of structural illumination and restoration algorithms. High spatial frequencies represented by diffracted beams from the off-axis illumination are mixed with the local oscillator beam, the dark field of the image is subtracted as is the low frequency image without its dark field. Then the spatial frequencies are reset in Fourier space and the whole image is reconstructed by combining high and low frequency sub-images.

To mathematically explain the structured illumination approach to IIM, first a simple mathematical description of a conventional coherent illumination microscopy image will be described and then the mathematical description will be extended to the prior art IIM experiment and finally to the structured illumination approach.

The total transmission through an arbitrary object (assumed to be periodic on large scale to allow Fourier sums rather than Fourier integrals) and illuminated by a plane wave at normal incidence can be given by:

$$\sum_{\forall k,l \in R} A_{k,l} \exp[ixk\omega_x + iyl\omega_y] e^{i\gamma_{k,l} z} = \qquad (1)$$
$$A_{0,0} e^{i\gamma_{0,0} z} + \sum_{k,l \neq 0} A_{k,l} \exp[ixk\omega_x + iyl\omega_y] e^{i\gamma_{k,l} z}$$

where $\omega_x$, $\omega_y$ are the discrete spatial frequency increments of the Fourier summation; x and y are orthogonal spatial coordinates;

$$\gamma_{k,l} \equiv \sqrt{\left(\frac{2\pi n}{\lambda}\right)^2 - (k\omega_x)^2 - (l\omega_y)^2}$$

with n the refractive index of the transmission medium (1 for air); R is the set of integers, for which $(|\gamma_{k,l}|)^2 > 0$, that is the range of integers for which the diffracted beams are within the bandpass of the transmission medium and are propagating in the z-direction, away from the object. Note that this representation is a scalar approximation that is appropriate as long as the angles do not get too large, and it is assumed below that all beams are polarized in the same direction. A more rigorous treatment is straightforward, but mathematically gets more complex and obscures the physical insight in these simpler equations.

The transmission through the optical system adds a filter factor:

$$T(0;0) A_{0,0} e^{i\gamma_{0,0} z} + \sum_{k,l \neq 0} T(k\omega_x; l\omega_y) A_{n,l} \exp[ix(k\omega_x) + iyl\omega_y] e^{i\gamma_{k,l} z} \qquad (2)$$

The transmission function of the objective lens is a simple bandpass function:

$$T(\omega_X; \omega_Y) = 1 \text{ for } \sqrt{\omega_X^2 + \omega_Y^2} \leq \omega_{MAX} \qquad (3)$$
$$= \frac{2\pi NA}{\lambda}$$
$$= 0 \text{ else,}$$

and the final image intensity can be obtained by taking the square modulus of equation 2, viz:

$$I(x, y, z) = [T(0, 0)]^2 |A_{0,0}|^2 + \qquad (4)$$

-continued $$\sum_{k,l} T(0,0)T(k\omega_x, l\omega_y)A_{0,0}A^*_{k,l}\exp[-i(k\omega_x x + l\omega_y y)]e^{i(\gamma_{0,0}-\gamma_{k,l})z} +$$

$$c.c. + \sum_{k,l}\sum_{k',l'} T(k\omega_x, l\omega_y)T(k'\omega_x, l'\omega_y)A_{k,l}A^*_{k',l'}\exp$$

$$\{i[(k-k')\omega_x x + (l-l')\omega_y y]\}e^{i(\gamma_{k,l}-\gamma_{k',l'})z} + c.c$$

Each of the three lines in this result has a simple physical interpretation. The top line is a constant independent of spatial coordinates, equal to the average intensity of the pattern. This ensures that the intensity is always positive as physically required. The second line represents the imaging terms that we want to retain. Finally the third line is the cross-correlation of the diffracted beams with themselves equivalent to the dark field image that would be obtained if the zero-order diffraction (transmission) was blocked at the back pupil plane. The imaging terms are band-limited to transverse spatial frequencies of $(2\pi/\lambda)NA$; the dark field terms extend out to $(4\pi/\lambda)NA$ and are typically weaker in intensity than the imaging terms since for an object with thickness$\ll\lambda$, $|A_{0,0}|$ is larger than any of the diffracted terms. In all of the summations the summation indices extend over all terms in R except for the zero-order term which has been explicitly separated. Equation 4 gives the intensity over all space beyond the objective lens. The image is obtained in the back image plane (z=0) where the exponentials in $\gamma z$ vanish. The focusing information is contained in these exponential terms and its characteristic length, the depth-of-field, depends on the NA, as is well known. A Fourier optics perspective provides additional insight into the three terms. The DC term (top line) is a $\delta$-function at the origin. The image terms fill a circle of radius $2\pi NA/\lambda$ as a result of the band-limited transmission function. Finally, the dark-field image contains frequencies up to $4\pi NA/\lambda$ as a result of the interference of the various diffracted orders.

It is well-known that additional, higher spatial frequency, information can be accessed with off-axis illumination. FIG. 1 shows a conventional IIM arrangement 100, wherein a collimated illumination beam 110 can be incident on an object 120 at an angle of incidence $\theta$. In particular in the case of IIM, the offset angle is chosen such that the zero-order transmission (reflection) is beyond the lens (130) NA, $$\omega_{offset} > \frac{2\pi NA}{\lambda}.$$

The result is that higher spatial frequency information is transmitted through the lens, but only a dark field image is recorded in a traditional coherent illumination microscopy configuration (without the reference beam 109). This is solved in IIM by introducing an auxiliary optical system 135, an interferometer that reinjects the zero-order transmission on the low-NA side of the lens to reset the spatial frequencies. In practice it is simpler to reintroduce the zero-order transmission as an appropriately mode matched point source in the back pupil plane without actually using the transmitted beam which is often blocked by the objective lens mount. Effectively, the interferometer results in a modified filter transfer function where the zero-order is transmitted even though it is outside the lens NA. The amplitude, the phase, and the offset position in the back focal plane of the objective have to be controlled to provide a correct sub-image. These are often set by using a nearby, known reference object along with the object of interest.

It is straightforward to extend the mathematical treatment to the off-axis illumination case. Equation 2 can be modified to:

$$A'_{0,0}e^{-i\omega_{off}x}e^{i(\gamma'_{0,0})z} + \qquad (5)$$

$$\sum_{k,l\neq 0} T(k\omega_x - \omega_{off}; l\omega_y)A_{n,l}\exp\left[\begin{array}{c}ix(k\omega_x - w_{off}) + \\ il\omega_y y\end{array}\right]e^{i\gamma'_{k,l}z}$$

where $\omega_{off}=2\pi \sin(\theta_{off})/\lambda$ is the frequency offset arising from the off-axis illumination at angle $\theta_{off}$ (assumed in the x-direction), the primes on the $\gamma$s indicate that the propagation directions take into account the offset illumination, and the prime on the $A_{0,0}$ refers to the re-injected 0-order.

Taking the square of equation 5 can provide the intensity on the imaging camera:

$$|A^*_{0,0}|^2 + \qquad \ldots \text{(dc offset)} \qquad (6)$$

$$\sum_{k,l\neq 0} A'_{0,0}A^*_{k,l}T\left(\begin{array}{c}k\omega_x - \omega_{off}; \\ l\omega_y\end{array}\right)\exp\left[\begin{array}{c}ik\omega_x x + \\ il\omega_y y\end{array}\right]e^{i(\gamma'_{0,0}-\gamma_{k,l})z} + c.c. + \ldots \text{(imaging)}$$

$$\sum_{k,l\neq 0'}\sum_{k',l'\neq 0} A_{k,l}T(k\omega_x - \omega_{off}; l\omega_y)A^*_{k',l'}T(k'\omega_x - \omega_{off}; l'\omega_y)$$

$$\exp\left[\begin{array}{c}i(k-k')\omega_x x + \\ i(l-l')\omega_y y\end{array}\right]e^{i(\gamma'_{k,l}-\gamma'_{k',l'})z} \qquad \ldots \text{(dark field)}$$

where the three terms on separate lines correspond to (top) a constant term, (middle) the imaging terms and (bottom) the dark field image. Subtracting out the dark field terms (by taking an image with the interferometer blocked so that only the third term survives) provides a sub-image that accurately captures the spatial frequency components that are transmitted through the optical system. Note that the imaging terms (middle line) are at the correct frequencies and that the offset illumination angle has cancelled out of the expression except for the filter transmission functions.

Changing both the illumination angle (and the angle of reintroduction) and the azimuthal angle changes the offset allowing recording of a different region of frequency space. Specifically, for Manhattan geometry (x,y oriented patterns) a second offset exposure to capture the high spatial frequencies in the y-direction, that is with the substrate rotated by $\pi/2$, can be used. Additional spatial frequency terms can be captured with large illumination angles.

Referring back to the FIG. 3, in the exemplary structured illumination approach to IIM, there can be two coherent illumination beams 210, 210', the first beam 210 can be at the same offset as in the previous example so that $\omega_{offset}$ is >

NA/λ, and the second beam 210' can be at the maximum offset that fits through the lens $\omega_{off} \leq NA/\lambda$, denoted as $\omega_{NA}$ in the equation. Then the fields are:

$$A_{0,0}\exp(-i\omega_{off}x)e^{i\gamma_{0,0}^{off}z} + \sum_{k,l\neq 0} A_{k,l}\exp[i(k\omega_x - \omega_{off})x + il\omega_y y]e^{i\gamma_{k,l}^{off}z} + \quad (7)$$

$$B_{0,0}\exp(-i\omega_{NA}x)e^{i\gamma_{0,0}^{NA}} + \sum_{p,r\neq 0} B_{p,r}\exp[i(p\omega_x - \omega_{NA})x + ir\omega_y y]e^{i\gamma_{p,r}^{NA}z}$$

where the series with coefficients $A_{k,j}$ are due to the first offset beam (210) and the second series with the coefficients $B_{p,q}$ are due to the second offset beam (210') and squaring while taking advantage of the fact that without the interferometer the $A_{0,0}$ beam 209 is not transmitted to the objective image plane while the $B_{0,0}$ beam 209' is transmitted through the lens 230 gives:

$$\begin{aligned}
&\left\{ |B_{0,0}|^2 + \sum_{p,r\neq 0} B_{0,0} B_{p,r}^* T\left(\frac{p\omega_x - \omega_{NA};}{r\omega_y}\right) \right. \quad [\text{I}] \\
&\exp\left[i\left(\frac{p\omega_x x + }{r\omega_y y}\right)\right] e^{i(\gamma_{0,0}^{NA} - \gamma_{p,r}^{NA})z} + c.c. + \\
&\left. \sum_{p,r\neq 0}\sum_{p',r'\neq 0} B_{p,r} B_{p',r'}^* T\left(\frac{p\omega_x - \omega_{NA};}{r\omega_y}\right) T\left(\frac{p'\omega_x - \omega_{NA};}{r'\omega_y}\right) \right. \\
&\left. \exp[i(p-p')x + i(r-r')y] e^{i(\gamma_{p,r}^{NA} - \gamma_{p',r'}^{NA})z} \right\} + \\
&\left\{ \sum_{k,l} B_{0,0} A_{k,l}^* T\left(\frac{l\omega_x - \omega_{off};}{n\omega_y}\right) \right. \quad [\text{II}] \\
&\left. \exp\left[\frac{-i(k\omega_x - \omega_{off} + \omega_{NA})x - }{i\omega_y y}\right] e^{i(\gamma_{0,0}^{NA} - \gamma_{k,l}^{off})z} + c.c. \right\} + \\
&\sum_{k,l}\sum_{k',l'} A_{k,l} A_{k',l'}^* T\left(\frac{k\omega_x - \omega_{off};}{l\omega_y}\right) T\left(\frac{k'\omega_x - \omega_{off};}{l'\omega_y}\right) \quad [\text{III}] \\
&\exp\left[\frac{i(k-k')\omega_x x + }{i(l-l')\omega_y y}\right] e^{i(\gamma_{k,l}^{off} - \gamma_{k',l'}^{off})z} + c.c. \\
&\sum_{k,l}\sum_{p,r\neq 0} A_{k,l} B_{p,r}^* T\left(\frac{k\omega_x - \omega_{off};}{l\omega_y}\right) T\left(\frac{p\omega_x - \omega_{NA};}{r\omega_y}\right) \times \quad [\text{IV}] \\
&\exp\left[\begin{array}{l} i(k-p)\omega_x + \\ i(\omega_{NA} - \omega_{off})x + \\ i(l-r)\omega_y \end{array}\right] e^{i(\gamma_{k,l}^{off} - \gamma_{p,r}^{NA})z} + c.c.
\end{aligned}$$

The first three terms in the upper bracket, labeled [I], in equation 8 are the result of the off-axis illumination at the edge of the pupil. This image can be measured independently by blocking the extreme off axis beam and subtracted from the result. The term labeled [II] is the desired information, the image terms beating against a zero-order beam; because the zero-order beam is not at the correct angle to reset the frequencies to match the object frequencies (adjusted for magnification) there is a shift between the observed and the actual image plane frequencies $\{\exp[i(\omega_{NA} - \omega_{off})x]\}$ that will need to be fixed computationally (e.g. one is measuring the Fourier components at an intermediate frequency as detailed above). [III] is the dark field from the extreme off-axis illumination. Finally the last term, [IV] is the cross-correlated dark field from the two illumination beams.

To remove the unwanted terms in equation 8, five strategies can be used. However, these are not intended to be all-inclusive and other possibilities may exist. These are illustrated schematically in FIGS. 5A-5E. There are two general approaches, in the FIGS. 5A-5C, the reference beam is added before the object plane. This adds to some additional complexity in that the off axis and the reference beams give rise to diffracted information and it is necessary to separate out the information corresponding to the diffraction from the reference beam from the off axis beam. This can be accomplished as shown in the scheme outlined in FIG. 4. In FIGS. 5D and 5E, the reference beam is added after the object plane and before the entrance to the collection lens. In these configurations, the reference beam does not illuminate the object and hence there is no additional diffraction. This simplifies the analysis, but at the cost of adding additional optical components in the region of limited access.

FIG. 5A shows the first embodiment, wherein the third optical system 500A can further include a first beamsplitter disposed in the optical path of the first optical system to collect a portion of the coherent illumination, one or more optical components to direct the portion of the coherent illumination as a reference beam 510' to illuminate the object 520 at an angle θ corresponding to less than the entrance angular aperture ($< \sim \sin^{-1} NA$) of the second optical system 530, and a dynamic (adjustable on/off) physical block 550 disposed in a back pupil plane of the second optical system 530 to alternately block and unblock a small portion of the pupil aperture corresponding to the position of the reference beam 510 in the aperture. One of the advantages of this embodiment is that all of the information can be retained. However, this embodiment requires access to the illumination system pupil. In the case shown in FIG. 5A, the objective pupil has been relayed to an auxiliary plane where it might be easier to access. The details of this optical configuration will depend on the optical construction of the objective lens.

FIG. 5B shows the second embodiment 500B, wherein both illumination beams can be shifted slightly using a prism 560 so that the zero order 209' can be blocked but there is no change in the exponential factor, only in the transmission factors. Using the first and second embodiments, one can obtain and subtract dark field optical intensities from the image formed by interference of low and high frequencies (the second, fourth, and fifth terms of equation 6). Then one can subtract low frequency image without dark field and restore high frequency image by shifting frequencies in Fourier space. The second embodiment can be implemented easily and does not require any access to the objective pupil plane but it has some image-dependent information loss associate with the shifting of the illumination angles. As shown in FIG. 5B, the prism is located in between the object 520 and the entrance aperture of the objective lens 530; alternatively it can be located before the object 520. Depending on the specifics of the object 520, it may be advantageous to dither the position of only the reference zero-order beam or of both zero-order beams.

Figure 6:
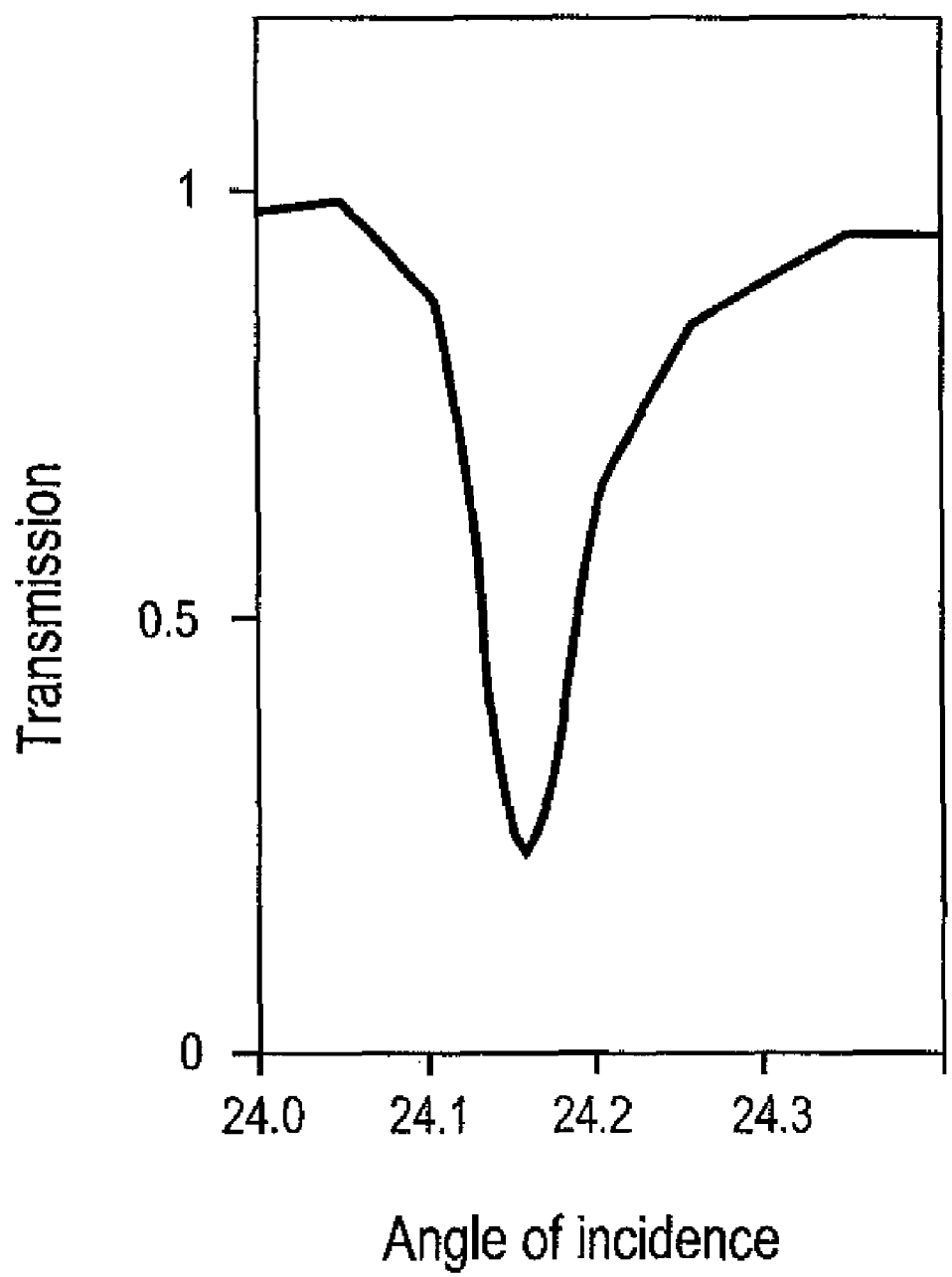
FIG. 6 shows k-vector filter characteristic of an exemplary SiN-on-glass guided mode resonance filter.

FIG. 5C shows yet another embodiment using a guided-mode filter (k-vector filter) 582 to block the zero order-transmission just before the objective 530 and transmit the diffracted information at all other angles. FIG. 6 shows an exemplary experimental un-optimized k-vector filter characteristic of a silicon-nitride-on-glass guided mode resonance filter, with a narrow angular width of the coupling. U.S. Pat. No. 5,216,680 discloses guided mode filter which can be used as an optical filter with very narrow line width and as an efficient optical switch, the disclosure of which is incorporated by reference herein in its entirety. Referring back to FIG. 5C, it is possible to switch the zero-order on and off by mechanical dithering of the angular position or by dithering by a small degree of rotation around the optical axis, shown generally by 590. This will allow identification of the source of the diffracted waves in the sub-image. Accordingly, the exemplary third optical system 500C of the apparatus 200 in accordance with various embodiments, can further include one or more optical components to direct the portion of the coherent illumination as a reference beam to illuminate the object 520 at an angle θ less than the entrance angular aperture ($<\sim\sin^{-1}$ NA) of said second collection optical system 530, the guided-mode resonance filter (k-vector filter) 582 disposed between the object plane 522 and a collection lens of the second optical system 530, and another device 527 to adjust the position, tilt and rotation of the guided-mode resonance filter 582 between positions, tilts and rotations in which it alternately transmits and blocks the portion of the reference beam transmitted through the object plane.

FIG. 5D shows yet another exemplary third optical system 500D of the apparatus 200 in accordance with various embodiments. The third optical system 500D can further include a first beamsplitter disposed in the optical path of the first optical system to collect a portion of the coherent illumination, one or more transfer optics disposed between the first optical system and the second optical system, and at least one of a grating 584 or a grating on a waveguide disposed between the object plane 522 and a front aperture of the collection lens (objective) of the second optical system 530 to reintroduce the portion of the coherent illumination as a reference beam into the second optical system 530 at an angle θ less than the entrance angular aperture ($<\sim\sin^{-1}$ NA) of the second optical system. In various embodiments, the grating 584 can have a short pitch (high spatial frequency) to avoid diffraction of the waves incident onto the grating 584 into new directions that are captured by the objective lens of the second optical system 530. A major advantage of this method is that it does not require switchable gratings or mechanical actuation of the filter, since modulation is by simple blocking of the incident beam.

FIG. 5E shows the fifth embodiment, wherein the zero order 510' can be re-injected after the object and just in front of the objective by a beamsplitter 570. Accordingly, the third optical system can include a second beamsplitter 570 disposed between the object plane 522 and a front aperture of a collection lens (objective) of the second optical system 530 to reintroduce the portion of the coherent illumination as a reference beam 510' into the second optical system 530 at an angle θ less than the entrance angular aperture ($<\sim\sin^{-1}$ NA) of the second optical system 530. The beamsplitter 570 can eliminate all of the diffracted beams associated with the local oscillator, $B_{p,r}=0, \forall p, r \neq 0$, and simplifies equation 8. The third embodiment does not contain the first, second and fifth terms at all, so it is the most robust for the image processing, but images can be distorted by aberration caused by the beamsplitter; this aberration can be corrected with additional optical components. Using a very thin beamsplitter, e.g., a pellicle, eliminates much of the aberration associated with an expanding beam passing through a tilted thin plate. The use of a beamsplitter impacts the working distance of the objective, but the depth-of-field and field-of-view advantages of IIM are retained.

Figure 7A:
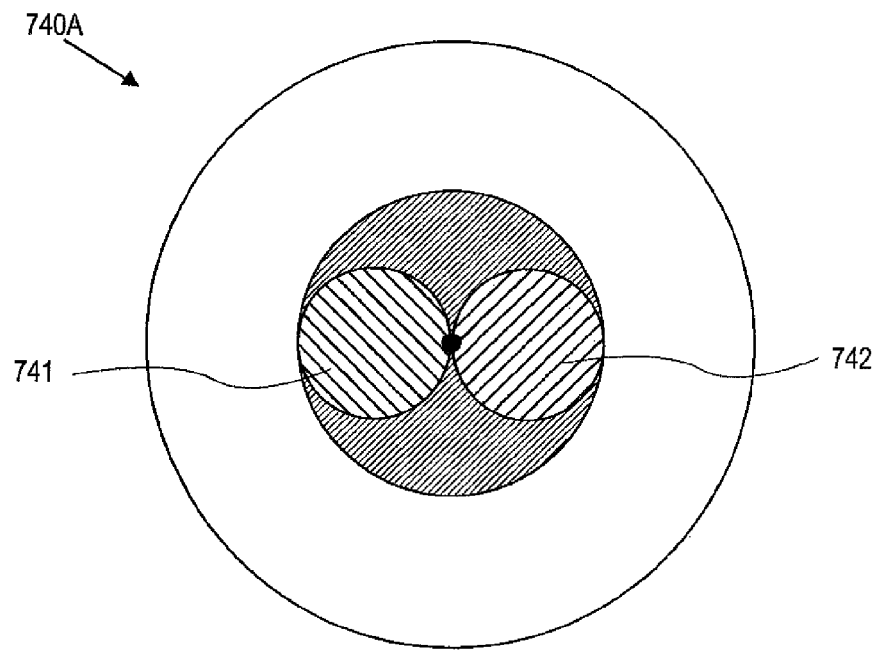
FIG. 7A shows the frequency space coverage for the arrangement of FIG. 3, with intermediate frequency offset within bandpass of lens.
Figure 7B:
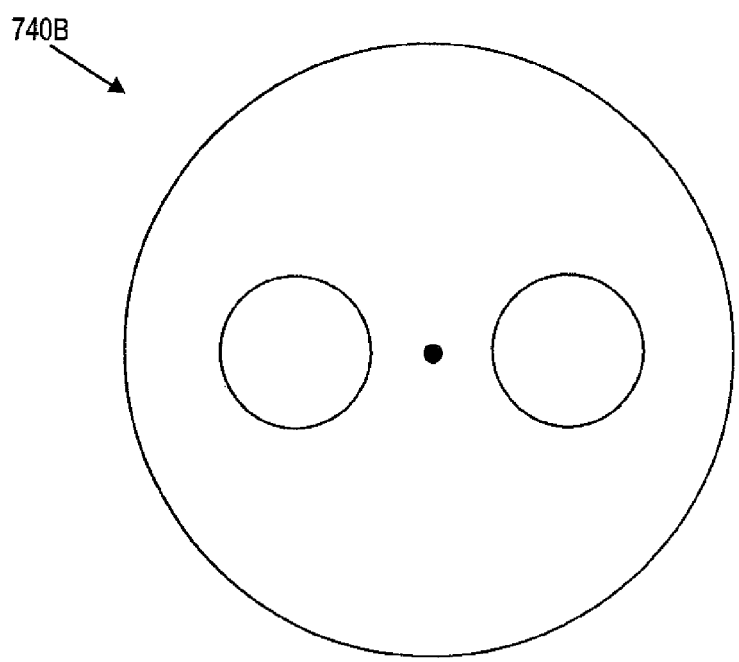
FIG. 7B shows the frequency space coverage for the arrangement of FIG. 3 after removal of the dark field and intermediate frequency imaging terms and correction of the observed frequencies.

FIGS. 7A and 7B show the frequency space coverage for the structured illumination approach to IIM shown in FIG. 3 and using the first embodiment as shown in FIG. 5A. All of the recorded frequencies are within the bandpass of the objective lens. The two offset circles 741, 742 in FIG. 7A correspond to coverage 740A of both the intermediate frequency imaging terms and the offset frequency imaging terms beating with the intermediate frequency local oscillator. FIG. 7B shows the coverage 740B after the unwanted dark field and local oscillator self-imaging terms have been removed and the spatial frequencies have been reset to their correct values.

Figure 8B:
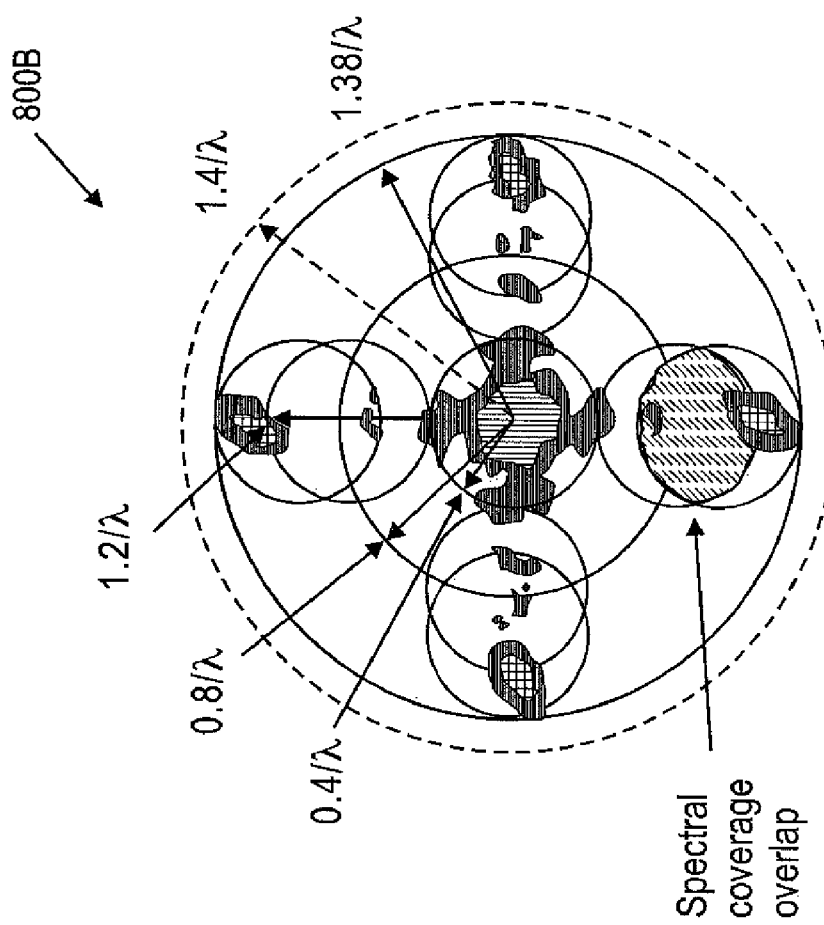
FIG. 8B illustrates intensity Fourier space components of the Manhattan geometry pattern shown in FIG. 8A, mapped onto a frequency space coverage of the imaging system.
Figure 8A:
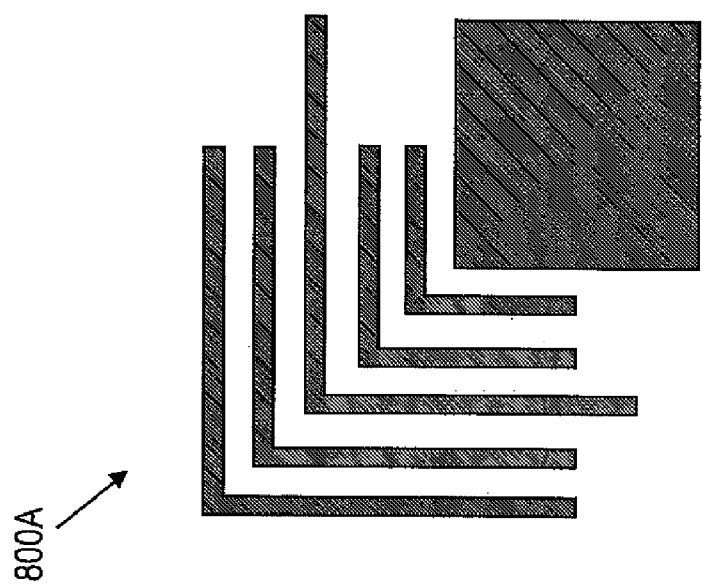
FIG. 8A schematically illustrates a Manhattan geometry pattern used for image resolution exploration consisting of five nested "ells" and a large box.

FIGS. 8A and 8B illustrate the frequency space coverage of partial images. FIG. 8A shows an illustration of a Manhattan (x, y) geometry pattern 800A used for image resolution exploration consisting of five nested "ells" and a large box. The lines and spaces of the "ells" are about 240 nm. FIG. 8B, indicated generally at 800B, shows the intensity Fourier space components of the pattern 800A, mapped onto the frequency space coverage of the imaging system using a NA=0.4 objective and an illumination wavelength of 633 nm (HeNe laser source). The resolution limit of this microscope system with conventional illumination is $\sim 0.6\lambda/NA$ ($\sim 950$ nm). The two circles at radii of $NA/\lambda$ ($0.4/\lambda$) and $2NA/\lambda$ ($0.8/\lambda$) correspond to the approximate frequency space limits for coherent and incoherent illumination, respectively, and reflect the low-pass transmission characteristic of the objective lens. The inner sets of small shifted circles (radius $NA/\lambda$) in FIG. 8B, that extend from $-3NA/\lambda$ to $3NA/\lambda$ ($\pm 1.2/\lambda$) in the x- and y-directions, show the frequency space coverage added with two offset partial images, one in each direction. The imaging is single side-band, only the diffracted plane waves to one side of the object are collected (opposite to the tilt of the illumination beam), the square law (intensity) response of the image formation and detection process restores the conjugate frequency space components, resulting in the two symmetrically displaced circles in FIG. 8B for each partial image. The offset (off-axis tilt) for these images was chosen at $2(2\pi) NA/\lambda$ to ensure that there was no overlap between the spectral coverage of the low-frequency partial image (extending out to $NA/\lambda$) and the offset images. As discussed previously, improved images can be obtained by subtracting the dark-field components of the image (with the zero-order transmission blocked). In the present embodiments, this provided a cosmetic, not a dramatic, improvement to the images. Additional frequency space coverage is available with a second pair of off-axis images, represented by the outer sets of shifted circles, with a larger tilt of the illumination plane wave, approaching grazing incidence (limited to 80° by practical considerations such as Fresnel reflectivity in the present experiment). The maximum frequency coverage in these images extends to $[\sin(80)+NA]/\lambda=(0.98+NA)/\lambda=(1.38/\lambda)$. The frequency-space coverage of the outer circles may be necessary to capture the fundamental frequency components of the line-space portion of this pattern. There is significant overlap between the frequency coverage of the first and second set of partial images as illustrated in FIG. 8B. To provide a faithful image, the double coverage of frequency space associated with the image spectral overlaps can be excluded. This can be accomplished by filtering the images either optically (with appropriate apertures in the back focal plane) or electronically once the images are recorded. Importantly, since each of the partial images involves only the NA of the objective, this imaging concept retains the working distance, depth-of-field and field-of-view associated with the low-NA objective, but has a resolution beyond that achievable with even the highest NA objective using traditional illumination approaches.

Figure 9:
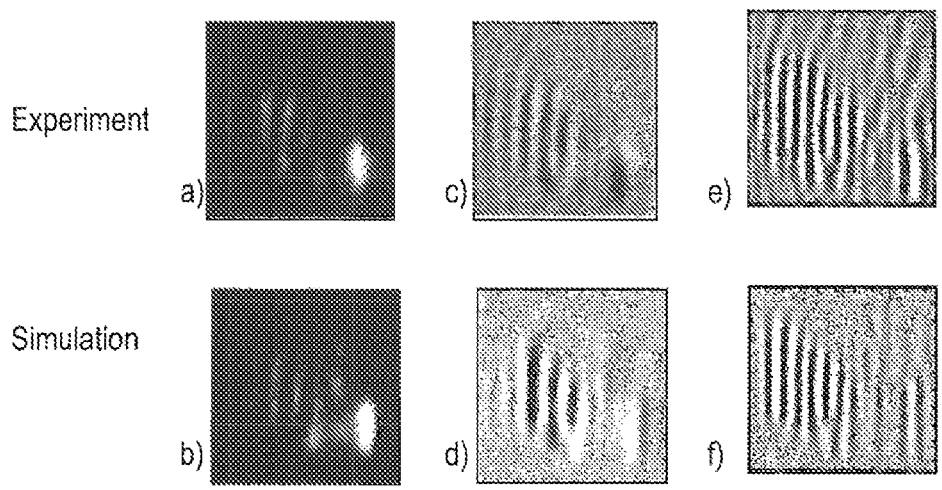
FIGS. 9A-9F show the preliminary results of an experiment using an NA=0.4 objective with a He—Ne laser illumination (λ=633 nm) and with about 240 nm structure with corresponding simulations using the configuration presented in FIG. 5A.

FIGS. 9A-9F show the preliminary results of an experiment using an NA=0.4 objective with a He—Ne laser illumination ($\lambda$=633 nm) and with about a 240 nm critical dimension structure with corresponding simulations using the configuration presented in FIG. 5D, blocking the zero-order beam of the reference in the objective lens pupil. FIG. 9A is the mixed image corresponding to the interference of the low and high images and FIG. 9B is the corresponding simulation result. FIG. 9C is the image after subtraction dark field and low frequency image and FIG. 9D is the corresponding simulation result. FIG. 9E is restored high frequency image and FIG. 9F is the corresponding simulated result.

Figure 10:
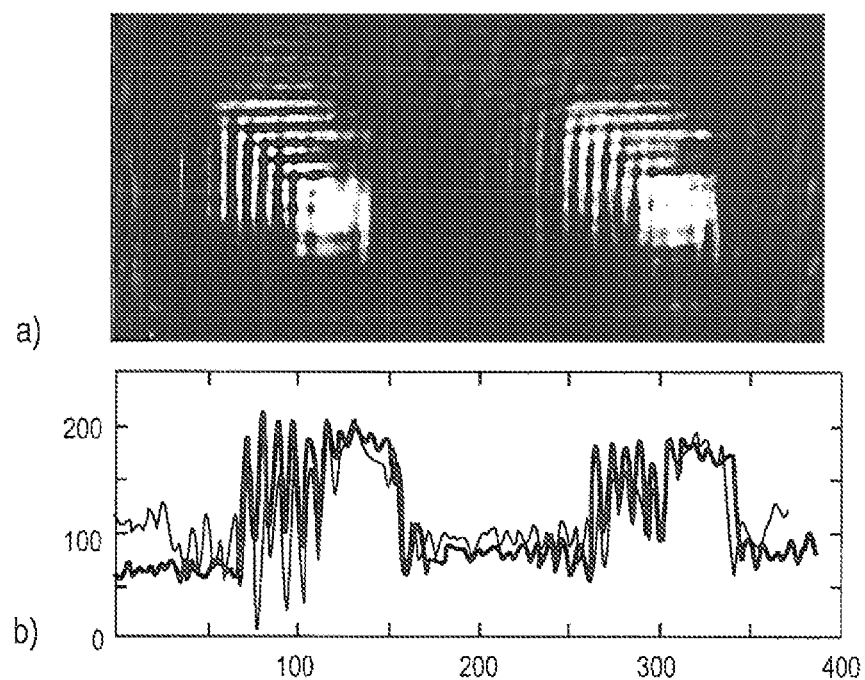
FIG. 10A shows reconstructed images of 260 nm and 240 nm CD structures obtained using the optical configuration of FIG. 5A after the dark field subtraction, frequency shifting correction, and sub-image combination.
FIG. 10B show a crosscut (gray) of the images of FIG. 10A compared with a crosscut of corresponding simulation (black).
Figure 11:
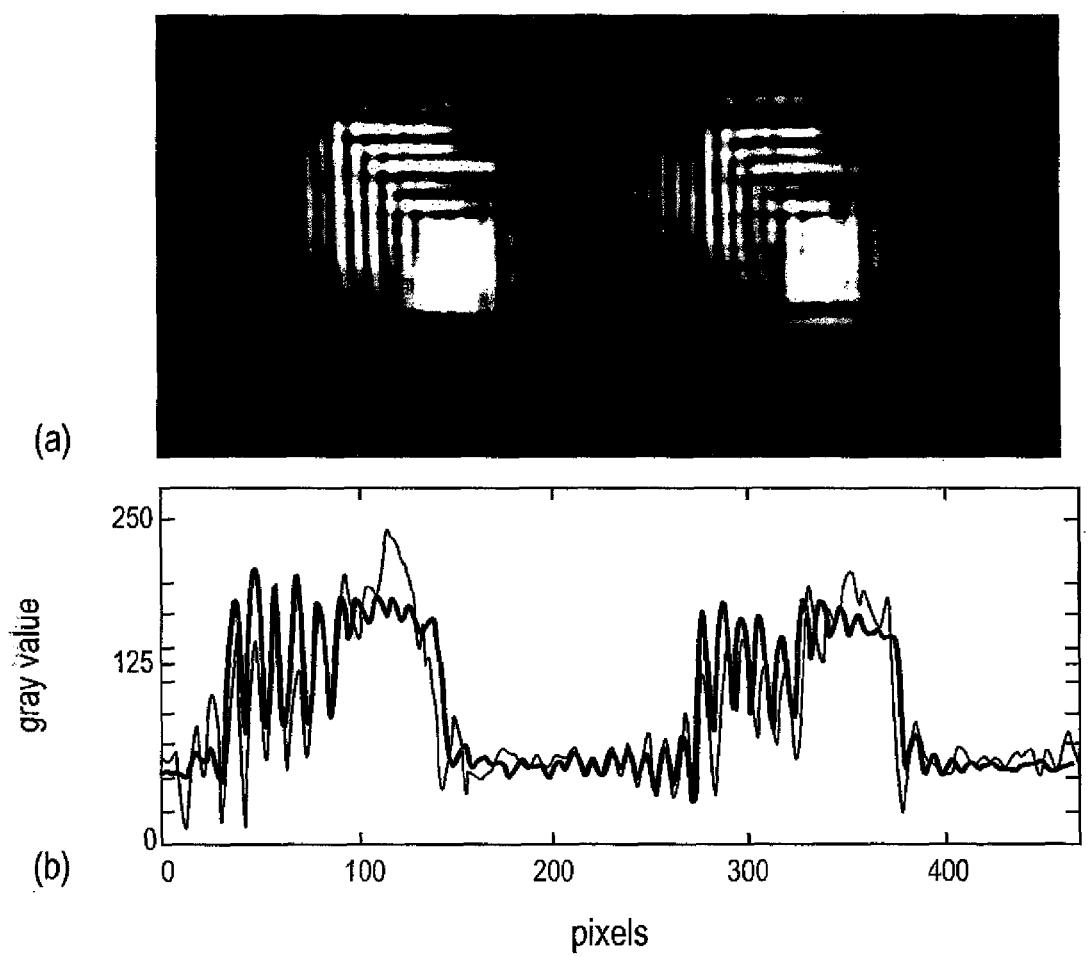
FIG. 11A shows reconstructed images of 260 nm and 240 nm CD structures obtained using the optical arrangement shown in FIG. 5E.
FIG. 11B shows a crosscut (gray) of the images of FIG. 10A compared with a crosscut of corresponding simulation (black).

Similarly, results using dynamic (adjustable on/off) physical block presented in FIG. 5A are shown in FIG. 10A. The same 260- and 240-nm objects are imaged as in FIG. 9C; only the final results after the dark field subtraction, frequency shifting correction and sub-image combination are shown. The corresponding cross-cuts are shown in FIG. 10B. A total of four offset images, two each in the x- and y-directions, with $\theta_{ill}$=53° and 80° were used along with a 0.4 NA objective. As discussed previously, this configuration provided resolution to <~240 nm CD. There is overlap in the frequency space coverage between these two exposures and electronic frequency space filtering is used to assure a uniform coverage of frequency space. The present Manhattan geometry structure has spectral content concentrated along the x- and y-directions, so the offset illuminations were restricted to those directions. Adding additional frequency-space coverage for arbitrarily shaped structures can be accomplished by taking additional sub-images with rotation of the object in the (x,y) plane. The spatial frequency-content of the image covers a wide range as a result of the large box (at 10× the linewidth of the line:space structures). The reconstructed image of the same structures obtained by the method with the beamsplitter configuration presented in FIG. 5E is shown in FIG. 11A and a crosscut of the image with corresponding simulation is shown in FIG. 11B. The quality of the results for both methods is quite comparable. The second method retains a long working distance, but requires access to the imaging system pupil for blocking the zero-order. The first method does not require any modification to the traditional microscopy components, but has reduced working distance due to the beamsplitter in front of the objective. There are some extra features experimentally as compared to the model due to the lack of precision in mutual phase determination between the sub-images and speckle effects from the coherent illumination. These issues can be reduced by using improved arrangements and lower coherence sources. There are other possible alternatives; the optimum choice will depend on the specifics of the object and the constraints of specific optical systems.

The embodiments discussed so far provide spatial frequency coverage up to $2\pi(\sin(\theta_{ill})+NA)/\lambda \approx 2\pi(1+NA)/\lambda$; that is the maximum illumination angle offset can be set close to 90° (providing the "1") and the maximum angle collected by the objective lens corresponds to $\sin^{-1}(NA)$. As was previously disclosed in relation to the interferometric implementation of IIM, additional spatial frequencies are available by tilting the object plane relative to the objective lens axis. This allows collection of spatial frequencies up to $4\pi/\lambda$, independent of the lens NA. The cost is a more complex signal processing requirement since the tilted object plane results in a nonlinear mapping of spatial frequencies from the object plane to the laboratory image that must be corrected to achieve a good image. This mapping has been discussed previously. The additional frequency space (and hence smaller image features) are available in the structured illumination embodiments of IIM disclosed herein.

Immersion microscopy is well known to provide higher spatial frequencies by a factor of the refractive index of the immersion medium, thereby extending the spatial frequency range to as high as $2n/\lambda$. Again the advantages of immersion are directly applicable to structured illumination IIM.

Traditionally immersion microscopy has been practiced in reflection with a liquid medium on top of the object, or in transmission where advantage is taken of the high refractive index of the substrate ($n_{sub}$) as well as that of a liquid on top of the object. An intermediate possibility is to use just the refractive index of the substrate without an immersion fluid. In this case the spatial frequency range is extended to $2\pi(n_{sub}+NA)\lambda$.

FIG. 12 shows an exemplary apparatus 1200 for microscopy with an IIM arrangement with illumination by evanescent waves extending from a substrate, where 12A and B refers to alternate positions of the collection lens, according to various embodiments of the present teachings. The apparatus 1200 can include an object plane 1222 on which can be disposed a first surface of a substrate 1225, wherein the substrate 1225, upon which is an object 1220, is characterized by a homogeneous refractive index ($n_{sub}$) and a surface normal 1226. The apparatus 1200 can also include a first optical system, including prisms 1262 and substrate 1265, disposed to provide a substantially coherent evanescent wave illumination of the object 1220, the illumination 1210 characterized by a wavelength λ and a radius of curvature and disposed at one of a plurality of incident wave vectors from about $2\pi/\lambda$ to about $2\pi n_{sub}/\lambda$ with respect to a surface normal of the substrate and at a plurality of azimuth angles spanning from about 0 to about $2\pi$, wherein the plurality of incident wave vectors correspond to angles beyond a total internal reflection angle $\theta_c$ of the substrate. The apparatus 1200 can also include a second optical system 1230 disposed to collect portions of the illumination 1208 scattered from the object plane 1222, the second optical system 1230 having an optical axis 1236 disposed at one of a plurality of angles from about 0 to about $\pi$ with respect to the substrate 1225 surface normal and at the azimuth angle corresponding to the illumination of the first optical system, wherein the second optical system 1230 is characterized by a numerical aperture (NA). FIG. 12B shows arrangement with tilted optical axis 1236'. The apparatus 1200 can also include a third optical system disposed in an optical path of the first optical system to provide interferometric reintroduction of a portion of the coherent illumination (reference beam) into the second optical system 1230 or 1230', wherein each of an amplitude, a phase, a radius of curvature and an angle of incidence of the reference is adjusted such that a correct reference wave is present at the image plane of the second optical system. The apparatus 1200 can further include an electronic image device disposed at an image plane of the second optical system that responds linearly to the local optical intensity and transfers the local optical intensity map across the image plane (a sub-image) to a signal processor device in electronic form. The apparatus 1200 can also include a device for adjusting the first, the second, and the third optical systems to collect sub-images for different pairs of the pluralities of incident (first optical system) and collection center (second optical system) wave vectors so as to sequentially obtain a plurality of sub-images corresponding to a plurality of regions of spatial frequency space and an electronic device to sequentially receive the electronic form of the sub-images and manipulate the sub-images to correct for distortions and alterations introduced by the optical configuration, store, and combine the plurality of sub-images corresponding to the plurality of regions of spatial frequency space to create a composite image corresponding to a synthetic aperture that is larger than the physical aperture of the collection lens 1230 or 1230'.

In some embodiments, the third optical system can further include a first beamsplitter disposed in the optical path of the first optical system before the object to collect a portion of the coherent illumination and one or more optics disposed between the first optical system and the second optical system 1230 are prisms 1262 within first optical system used to inject into substrate at angles beyond total internal reflection to interferometrically reintroduce the portion of the coherent illumination as a reference beam into the second optical system 1230 in a position after the exit aperture of a collection (objective) lens, wherein the reintroduction is at one of a position corresponding to a position a zero-order beam would have had if it had been transmitted through a higher NA lens of the second optical system 1230 or an aliased position to reduce pixel requirements of the electronic image device, wherein the signal processor is adjusted to compensate for this spatial frequency aliasing (the same concept as the local oscillator frequency introduced earlier). In other embodiments, the third optical system of the apparatus 1200 can include one of the configurations shown in FIGS. 5A-5E.

In certain embodiments apparatus 1200 for microscopy with an IIM arrangement with illumination by evanescent waves extending from a substrate can also include at least one known reference object to cover a small part of the image field.

According to various embodiments, there is a method for microscopy by evanescent illumination through a substrate. The method can include providing an object 1220 disposed on a surface of a planar substrate 1225 characterized by a homogeneous refractive index ($n_{sub}$) and a surface normal 1226 and providing a first optical system disposed to provide an evanescent wave illumination of the object plane 1222 by providing a substantially coherent illumination of the object plane 1222, the illumination characterized by a wavelength $\lambda$ and a radius of curvature and disposed at one of a plurality of incident wave vectors from about $2\pi/\lambda$ to about $2\pi n_{sub}/\lambda$ with respect to a surface normal of the substrate and at a multiplicity of azimuth angles spanning 0 to $2\pi$, wherein the plurality of incident wave vectors correspond to angles beyond a total internal reflection angle $\theta_c$ of the substrate. The method can further include providing a second optical system 1230 having an optical axis 1236 disposed at one of a plurality of center wave vectors from about 0 to about $2\pi/\lambda$ with respect to the surface normal, wherein the second optical system 1230 is characterized by a numerical aperture (NA). The method can also include providing a third optical system disposed in an optical path of the first optical system to provide interferometric reintroduction of a portion of the coherent plane wave illumination (reference beam) into the second optical system 1230, wherein the amplitude, phase, and position of the reintroduced illumination wave in the image plane of the second optical system 1230 can be adjusted. The method can further include recording a sub-image of the object 1220 at an object plane 1222 using an electronic image device, wherein the sub-image is formed as a result of interference of the scattering from the coherent plane wave illumination of the object and the reference beam; adjusting the first, the second, and the third optical systems to sequentially collect a plurality of sub-images corresponding to a plurality of regions of spatial frequency space; manipulating each of the plurality of sub-images using a signal processor to correct for distortions and alterations introduced by the optical configuration; and combining the plurality of sub-images into a composite image to provide a substantially faithful image of the object. In various embodiments, the method can further include one or more processes of subtraction of dark field images, subtraction of background images, shifting of spatial frequencies in accordance with the optical configuration, and elimination of one or more overlapping coverages of the frequency space wherein the elimination operations can be performed either in the optical systems or in the signal processing. In some embodiments, the method can also include selection of the regions of spatial frequency space to provide a more or less faithful image of the object in the object plane. Neumann et al. in Optics Express, Vol. 16, No. 25, 2008 pp 20477-20483 describes an evanescent wave illumination for further extending the resolution limit of imaging interferometric microscopy to $\lambda\backslash[2(n+1)]$, the disclosure of which is incorporated herein by reference in its entirety.

In various embodiments, the step of providing an object 1220 disposed on a surface of a planar substrate 1225 can include providing a cladding layer surrounding the object 1220 and the object 1220 disposed over the substrate 1225. The extent of excitation region due to evanescent wave illumination, normal to the interface is given by an exponential decay function with a 1/e length of $\lambda/2\pi\sqrt{n_{sub}^2 \sin^2\theta - n_{clad}^2}$, where $n_{sub}$ is the refractive index of the substrate and $n_{clad}$ is the refractive index of the superstrate or cladding material surrounding the object 1220. The spatial localization can provide benefit, for example in TIRF (total internal reflection fluorescence) the localization is much larger than can be achieved with a simple focus or even with confocal microscopy. In other cases, this decay length can be a restriction, for example, in lithography studies where there might be multiple layers of material (bottom AR coating and photoresist for example) and the structural variation between these layers is of interest. Hence, the addition of a cladding layer surrounding the object can allow some degree of tuning of the decay length, and thereby control the signal to noise ratio.

Figure 13A:
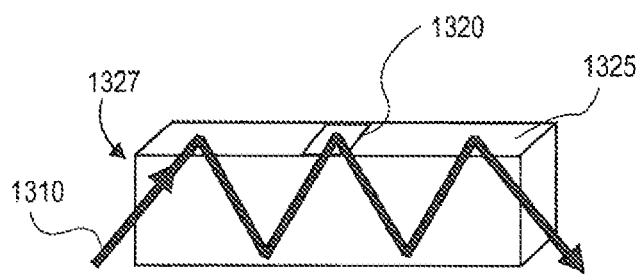
FIGS. 13A-13C show alternate approaches for coupling light for substrate illumination, in accordance with various embodiments.
Figure 13B:
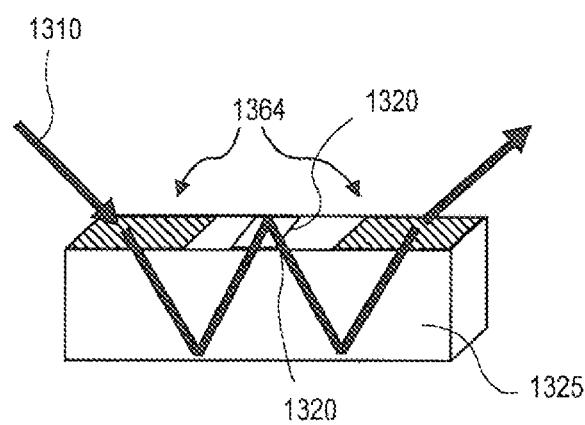
Figure 13C:
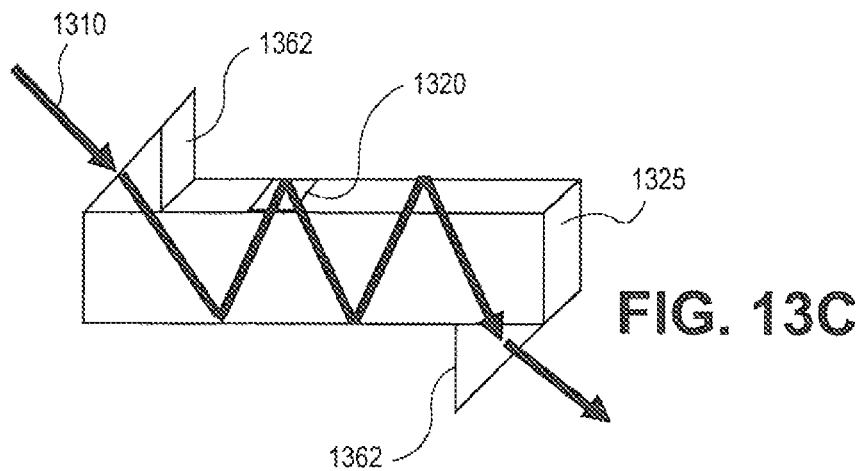

FIGS. 13A-13C shows several exemplary techniques for part of the first optical system to provide illumination through the substrate 1325. FIG. 13A shows coupling of incident beam 1310 through a side 1326 of the substrate 1325, which can be polished at an angle different from normal to the object 1320; in other words the substrate 1325 can be a prism. FIG. 13B shows one or more gratings 1364 on a side of the substrate 1325 the same as that where the object 1320 can be located. Alternatively, the gratings 1364 can be placed on a side opposite to that of the object 1320. FIG. 13C shows coupling of the incident beam 1310 using one or more prisms 1362.

Figure 14A:
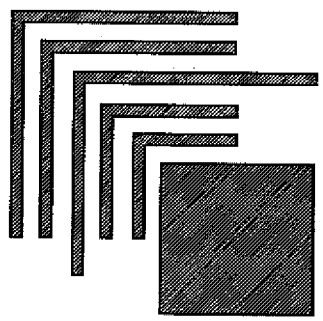
FIG. 14A schematically illustrates Manhattan geometry pattern used for image resolution exploration consisting of five nested "ells" and a large box.
Figure 14B:
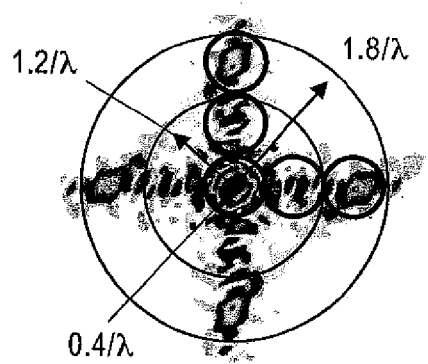
FIG. 14B illustrates intensity Fourier space components of the Manhattan geometry pattern shown in FIG. 14A, mapped onto a frequency space coverage of the imaging system, for a structure with CD=180 nm for the optical arrangement shown in FIG. 3.
Figure 14C:
FIG. 14C illustrates intensity Fourier space components of the Manhattan geometry pattern shown in FIG. 12A, mapped onto a frequency space coverage of the imaging system, for a structure with CD=150 nm for the optical arrangement shown in FIG. 11A.

FIG. 14A shows a Manhattan (x-, y-geometry) test pattern, scaled to different dimensions. The Fourier intensity transform of this pattern for a linewidth (critical dimension or CD) of 180 nm is shown in FIG. 14B and for a CD of 150 nm in FIG. 13C. The circles in FIGS. 14B and 14C correspond to the bandpass limits of various microscopy configurations. The circle in the center of FIG. 14B, with a radius of NA/$\lambda$=0.4/$\lambda$, corresponds to the Abbé-limit spatial frequency range captured with on-axis coherent illumination (NA$_{ill}$=0). The inner set of shifted circles in FIG. 14B (only single sidebands are shown for clarity; the complex conjugate regions are covered as well) correspond to IIM with off-axis illumination beams at $\theta_{ill}$=53° in the x, y-directions that extend the frequency coverage to a radius 3NA/$\lambda$~1.2/$\lambda$. Additional frequency space coverage (second pair of circles) is available using evanescent wave illumination extending the frequency space coverage to a radius of $(n_{sub} \sin \theta_{ill}+NA)/\lambda$~1.87/$\lambda$ (with $\theta_{ill}$=76°) without tilt of the microscope optical axis. The frequency space coverage along with the corresponding structure Fourier intensity plot for the structure with CD=150 nm is shown in FIG. 14C. The third pair of off-axis sub-images in FIG. 14C correspond to the tilted optical axis. This frequency region is elliptical rather than circular, due to non-paraxial and conical diffraction effects associated with the off-axis optical system.

FIG. 15A shows the experimental result for an object containing both 180- and 170-nm CD structures in a single large-field image using the apparatus of FIG. 12A (two pairs of offset illumination, one at 53° in air and one at 76° in the substrate and collection with the optical axis along the substrate's surface normal as shown in FIG. 12A. The 180-nm CD object is within the bandwidth capabilities of this optical system while the 170-nm CD object has significant spatial frequencies that extend beyond the optical system bandwidth and so is not fully resolved. The five nested "ell" shapes are distinguishable for the 180-nm CD, but not for the 170-nm CD. The positions of the two objects are correctly restored by the image restoration procedure as is evident from the good positional overlap between the experimental and theoretical cross-cuts in FIG. 15B.

FIG. 16A shows reconstructed high frequency image of a 150 nm structure using evanescent illumination and a tilted optical system, shown in FIG. 12B, with the highest spatial frequencies collected with the optical axis tilted with respect to the substrate's surface normal. FIG. 16B shows high frequency image simulation of a 150 nm structure using evanescent illumination and a tilted optical system, shown in FIG. 12B. FIG. 16C shows experimental and simulation cross-cuts of images shown in FIGS. 16A and 16B. FIG. 16D shows reconstructed composite image of a 150 nm structure using evanescent illumination and a tilted optical system, shown in FIG. 12B. FIG. 16E shows composite image simulation of a 150 nm structure using evanescent illumination and a tilted optical system, shown in FIG. 12B. FIG. 16F shows experimental and simulation cross-cuts of images shown in FIGS. 16D and 16E.

Evanescent illumination can be combined with structural illumination eliminating the need for access to the back focal plane. This moves the interferometer to the front of the objective lens and makes IIM readily adaptable to existing microscopes. Structural illumination is roughly equivalent to recording the spectral information at an intermediate frequency; additional computation is required to reset the frequencies. But this frequency shifting can reduce the camera pixel size and count requirements. Evanescent wave illumination can be used to extend the resolution of IIM to $\lambda/2(n+1)$. Furthermore, IIM provides an important advantage over conventional immersion microscopy techniques. Since only a relatively small region of frequency space ($\sim NA/\lambda$) is recorded in each sub-image, the aberration requirements on the objective lens are dramatically reduced. Hence, a simple set of prisms or gratings can be used to extract, and conventional air-based lenses to capture, the information. As is always the case, there is a trade-off between the number of sub-images and the NA of the objective lens.

Figure 17:
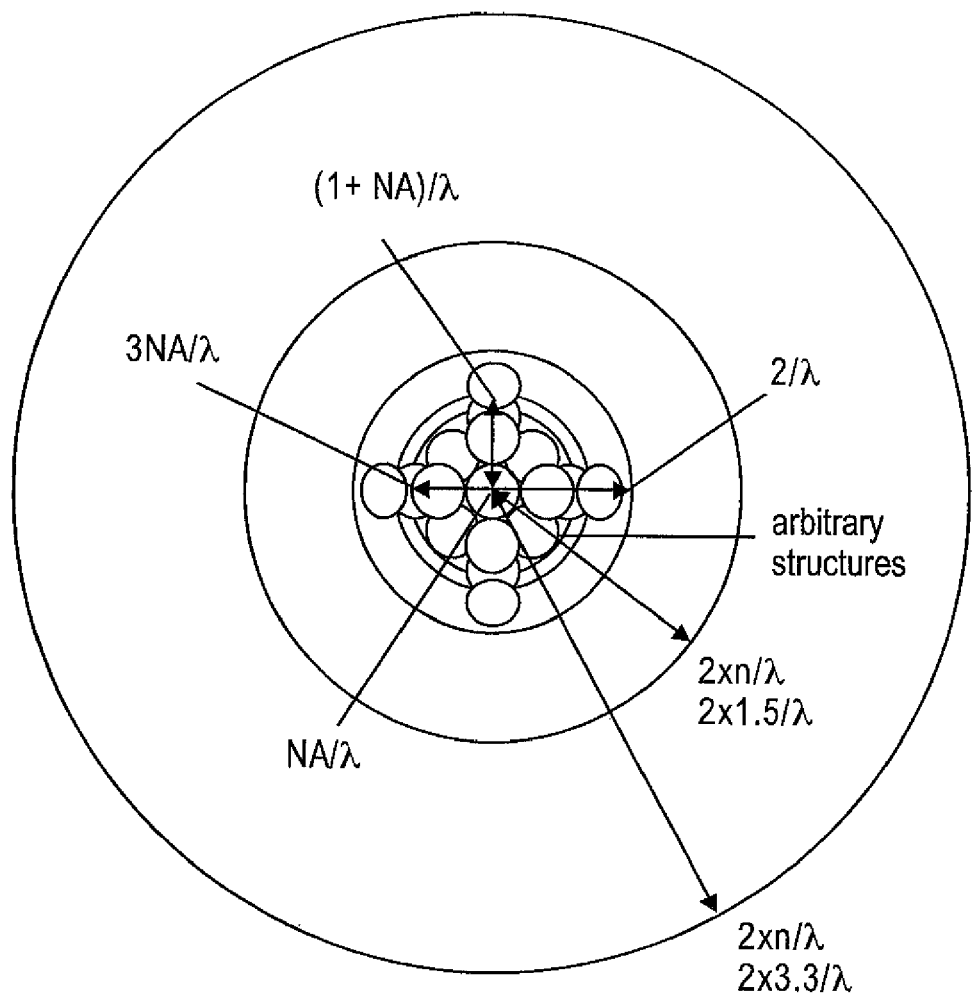
FIG. 17 shows available frequency space coverage for various IIM optical configurations, in accordance with the present teachings.

FIG. 17 shows the possible increase of $NA_{eff}$, drawn for a 0.4 NA system. As the frequency coverage is extended, the use of higher NA lenses can reduce the number of sub-images required for a more complete coverage of frequency space. Of course the required coverage is dependent on the pattern, and there are some applications, for example in metrology for integrated circuits, where coverage of a subset of the full frequency space is appropriate, where the range of spatial frequencies in the object are limited by lithographic consideration.

Figure 18:
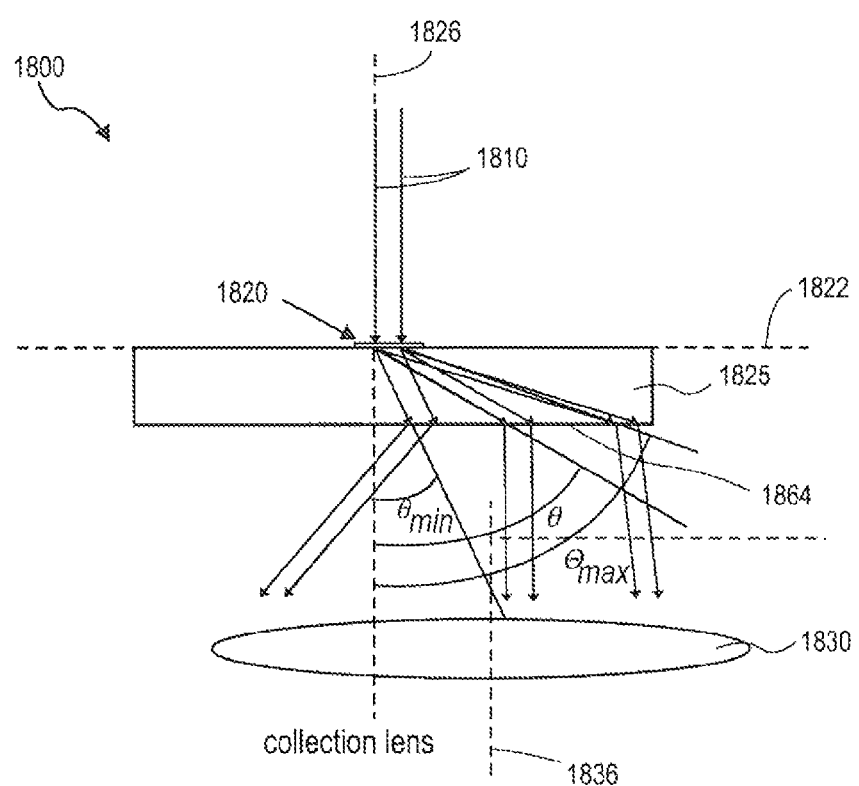
FIG. 18 shows a schematic diagram showing the high angle light scattered from an object and extracted from the substrate using at least one grating, in accordance with various embodiments of the present teachings.

There are diffracted beams corresponding to even larger spatial frequencies (smaller features) scattered back into the substrate at angles larger than the critical angle. For planar substrate, these beams are totally internally reflected and are not accessible. FIG. 18 shows another exemplary IIM optical arrangement for an apparatus 1800 for microscopy that provides access to the higher spatial frequency terms and thereby provides higher resolution, according to various embodiments of the present teachings. The apparatus 1800 can include an object plane 1822 on which can be disposed a first surface of a planar substrate 1825, wherein the substrate 1825 is characterized by a homogeneous refractive index ($n_{sub}$) and a surface normal 1826. The apparatus 1800 can also include a first optical system disposed to provide a substantially coherent illumination 1810 of the object plane, the illumination characterized by a wavelength $\lambda$ and a radius of curvature and disposed at one of a plurality of incident wave vectors from about 0 to about $2\pi n_{sub}/\lambda$ with respect to a surface normal 1826 of the substrate 1825 and at a plurality of azimuth angles spanning from about 0 to about $2\pi$. The apparatus 1800 can further include at least one grating 1864 on the side of the substrate 1825 opposite the object plane 1822, wherein each grating 1864 is characterized by a period, a depth, a grating profile, a position, and an extent to further transform the scattered waves in the substrate reflected from the illumination by the object into propagating waves in the medium below the substrate. In some embodiments, the medium below the substrate 1825 can be air. In other embodiments, the medium can be a vacuum. However, the medium can include any other suitable material. The apparatus 1800 can further include a second optical system 1830 having an optical axis 1836 disposed at one of a plurality of center angles from about 0 to about $\pi$ with respect to the surface normal 1826, wherein the second optical system 1830 can include one or more gratings 1864 on the second side of the substrate 1825 and is characterized by a numerical aperture (NA). The apparatus 1800 can also include a third optical system disposed in an optical path of the first optical system to provide interferometric reintroduction of a portion of the coherent illumination (reference beam) into the second optical system 1830, wherein each of an amplitude, a phase, a radius of curvature, path length, and an angle of incidence of the reference can be adjusted such that a correct reference wave is present at the image plane of the second optical system. The apparatus 1800 can further include an electronic image device disposed at an image plane of the second optical system 1830 that responds linearly to the local optical intensity and transfers the local optical intensity map across the image plane (a sub-image) to a signal processor device in electronic form, a signal processor that receives the electronic form of the sub-image and manipulates the sub-image to correct for distortions and alteration introduced by the optical configuration, and to collect, store and combine a plurality of sub-images corresponding to a plurality of regions of spatial frequency space to create a composite image, wherein the plurality of sub-images are formed as a result of adjustments to the first, the second, and the third optical systems. In various embodiments, the third optical system of the apparatus 1800 can include one of the third optical system configurations shown in FIGS. 5A-5E.

In various embodiments, the grating 1864 profile can have an impact on the extraction efficiency. In some embodiments, the grating 1864 can have a sinusoidal profile. A sinusoidal grating has components in its Fourier transform only at $\pm 1/d$. In other embodiments, the grating 1864 can have a rectangular profile. A rectangular grating has many more Fourier components that can lead to coupling of additional scattered image plane waves across the interface. For equal line: space grating, the second order Fourier coefficient (@$\pm 2/d$) vanishes, although for sufficiently deep gratings, comparable to the wavelength, additional coupling terms can arise. The third order terms (at $\pm 3/d$) are always present for rectangular grating profiles. This can give rise to multiple coupling orders which can lead to artifacts in the sub-images. In some arrangements, this is not an issue because of the spatial separation of the scattered spatial frequency information at the bottom of the substrate (as can be seen in FIG. 18). In this case, the bottom substrate plane is separated from the object plane and the different spatial frequency components, propagating at different angles, have separated to some extent by the time they reach this plane. If the thickness of the substrate 1825 is significantly larger than the field of view (illuminated aperture at the image plane), this separation can be large enough to avoid issues associated with higher order coupling at the bottom surface extraction grating. Thus, there is engineering trade-off in choosing the thickness of the substrate 1825, the separation is better if it is thicker, but the phase distortions are increased.

Figure 19:
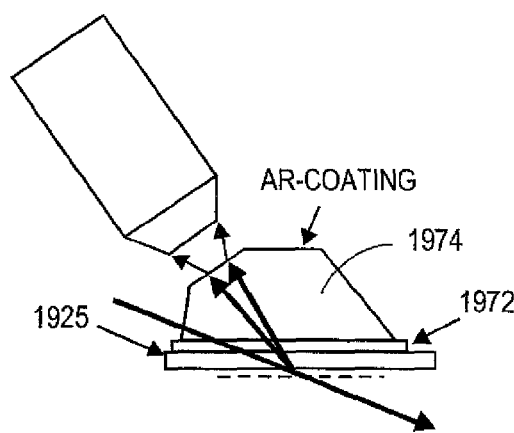
FIG. 19 shows prism coupling for extracting light scattered into a substrate, in accordance with various teachings.

Alternative collection schemes can include using one or more prisms 1974, as shown in FIG. 19. In some embodiments, the prism 1974 can be fabricated as part of the substrate 1925. In other embodiments, index matching fluid 1972 can be used.

In certain embodiments apparatus 1800 for microscopy can also include at least one known reference object to cover a small part of the image field.

According to various embodiments, there is a method for microscopy by illumination through a substrate. The method can include providing an object 1820 disposed over a first side of a planar substrate 1825, the substrate characterized by a homogeneous refractive index ($n_{sub}$) and a surface normal 1826 such that the object 1820 is separated from the substrate 1825 by a distance of no more than about $\leq \lambda$. The method can also include providing at least one grating 1864 on the side of the substrate 1825 opposite the object plane 1822, each grating 1864 characterized by a position, a period, a depth, and a grating profile, wherein each of the gratings 1864 can further scatter reflected waves resulting from the coherent illumination of the object into propagating waves in the medium below the substrate. The method can further include providing a first optical system disposed to provide a substantially coherent illumination of the object plane, the illumination characterized by a wavelength $\lambda$ and a radius of curvature and disposed at one of a plurality of incident wave vectors from about 0 to about $2\pi n_{sub}/\lambda$ with respect to a surface normal of the substrate and at a plurality of azimuth angles spanning from about 0 to about $2\pi$. The method can also include providing a second optical system 1830 having an optical axis 1836 disposed at one of a plurality of center wave vectors from about 0 to about $2\pi/\lambda$ with respect to the surface normal 1826, wherein the second optical system 1830 includes at least one grating 1864 on the second side of the substrate 1825 and is characterized by a numerical aperture (NA). The method can further include providing a third optical system disposed in an optical path of the first optical system to provide interferometric reintroduction of a portion of the coherent illumination (reference beam) into the second optical system 1830, wherein each of an amplitude, a phase, a radius of curvature and an angle of incidence of the reference is adjusted as required such that a corrected reference wave is present at the image plane of the second optical system 1830. The method can also include providing an electronic image device disposed at an image plane of the second optical system 1830 that responds linearly to the local optical intensity and transfers the local optical intensity map across the image plane (a sub-image) to a signal processor device in electronic form, providing a signal processor that receives the electronic form of the sub-image, manipulating each of the plurality of sub-images using the signal processor to correct for distortions and alterations introduced by the optical configuration, and combining the plurality of sub-images into a composite image to provide a substantially faithful image of the object.

In various embodiments, the method can further include one or more processes of subtraction of dark field images, subtraction of background images, shifting of spatial frequencies in accordance with the optical configuration, and elimination of one or more overlapping coverages of the frequency space wherein the elimination operations can be performed either in the optical systems or in the signal processing. In some embodiments, the method can also include selecting regions of spatial frequency space to provide a more or less faithful image of the object in the object plane.

For various IIM configurations shown in FIGS. 3, 12, and 18, the coherence length>>sample (object) dimensions. The He—Ne laser has a long coherence length of many cm, and this makes the experimental arrangement simpler, as it is not necessary to critically match the interferometer lengths between the objective arm and the zero-order reinjection arm. However, it does increase spurious speckle effects associated with stray light and multiple reflections from various optical surfaces in the setup. These effects can be mitigated by choosing a source with sufficient coherence for the IIM measurements, but insufficient coherence for Fabry-Perot effects, e.g. between the front and back sides of the substrate or between the substrate and the objective entrance surface. Since, these dimensions are very different, µm scale for the sample to several mm for the substrate thickness and substrate-objective distance, it is possible to minimize unrelated Fabry-Perot effects while retaining all of the resolution of IIM.

Tiling of Frequency Space

In general, the spatial frequency location of the information corresponding to a specific angle of illumination (including illumination through the substrate) and angle of collection ($\theta$) corresponds to $$\vec{k}_{scatter} = \frac{2\pi(n)}{\lambda}\sin\theta_{illumination}\hat{e}_{illumination} - \frac{2\pi n_{sub}}{\lambda}\sin\theta_{scattered}\hat{e}_{scattered}$$

In the above equation, (n) in the first term is adjusted as appropriate, for example, for illumination in air, n=1 while for illumination (evanescent) through a substrate, n=$n_{sub}$=1.5 for glass. In keeping with the notation established above, $\theta_{scattered}$ is the angle in the substrate and so the factor $n_{sub}$ is appropriate; a grating can be used to shift the spatial frequencies into the air propagation bandpass as necessary.

Both angles as well as the pitch of any gratings can provide some flexibility in the tiling of frequency space, i.e. in choosing the regions of frequency images into a complete image. The maximum spatial frequency, $k_{max}=2\pi f_{max}=2\pi(2n_{sub}/\lambda)$ is obtained when both angles are close to 90°. Since we can resolve a half pitch, this leads to an Abbe resolution limit of $\lambda/4n_{sub}$. The optimum strategy is pattern dependent, for example, for Manhattan geometry structures with edges confined to a rectangular grid, often found in integrated circuits, it is important to capture the frequency information along the axes and of less consequence to capture the information away from the axes where the Fourier transform of the pattern has lower spectral intensity. In the examples shown in FIGS. 19A and 19B, only one principal axis is considered, but the generalization to complete coverage is straightforward.

Figure 20A:
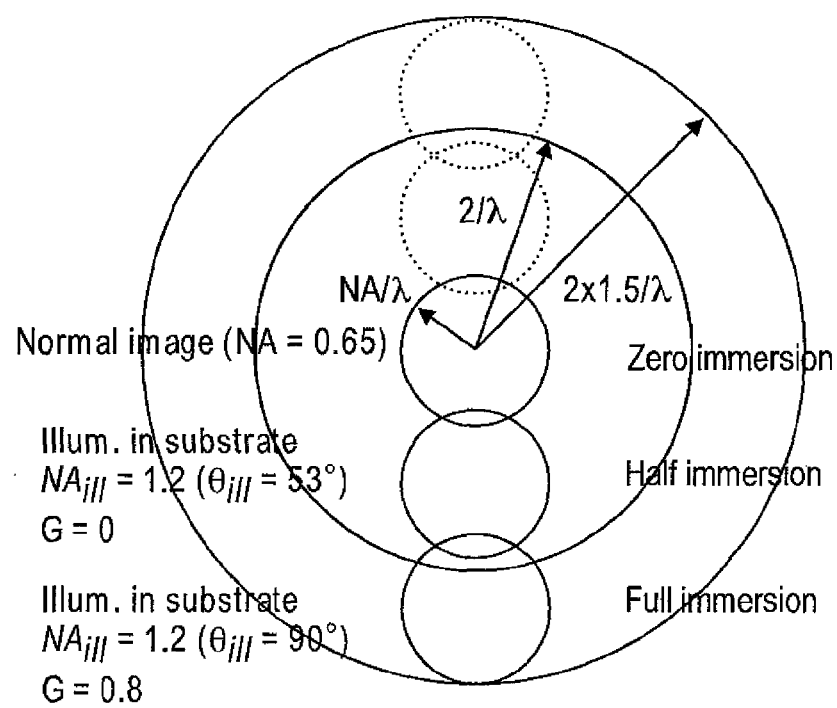
FIGS. 20A and 20B show embodiments for tiling frequency space with a substrate (n=1.5) in one direction, in accordance with various embodiments.
Figure 20B:
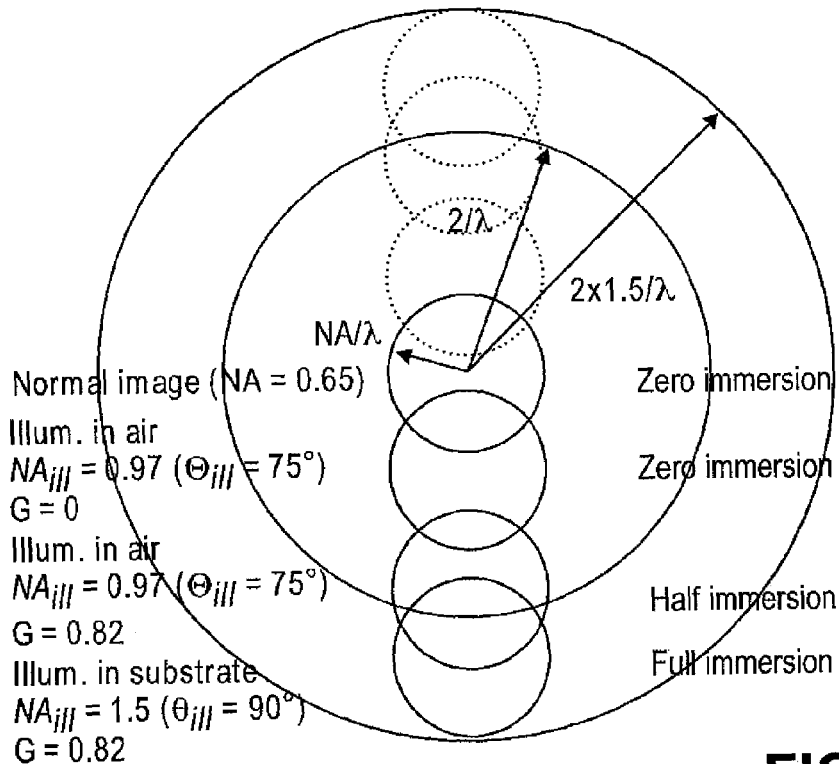

FIGS. 20A and 20B show two alternate embodiments for providing coverage from $f_x=0$ to $f_x=2n_{sub}/\lambda$ with a fixed objective NA. The frequency space coverages shown in FIGS. 20A and 20B are designed for a maximum spatial frequency of $3/\lambda$ ($2n_{sub}/\lambda$), and an objective of NA of 0.65. In FIG. 20A, a minimum number of subimages are used. The central small circle corresponds to conventional, normal incidence coherent illumination with the radius of the circle being about $0.65/\lambda$. The next sub-image is taken with off-axis illumination through the substrate at an angle of about 53°; this corresponds to effective $NA_{ill}$ of about 1.2. The scattered light can be detected either from the top (through air) or through the substrate, the collection geometry can be similar to that shown in FIG. 18, except for the illumination direction. A zero-order (interferometric reference) beam can be used in IIM to provide access to the essential phase information as well as to allow unambiguous assignment of the directly measured spatial frequencies. The square law, intensity detection process restores both the complex conjugate frequencies within the symmetrically located dotted circle in the figure. A third sub-image can be taken with grazing incidence illumination through the substrate, and with higher scattered spatial frequencies with the use of a grating of period $\lambda/0.8$ for extraction as in FIG. 18. Again, the complex conjugate spatial frequencies are restored by the square-law detection process. For a Manhattan geometry object, a similar set of sub-images in the orthogonal direction can be used, for a total of five sub-images; arbitrary structures may require additional sub-images to fill all of frequency space.

FIG. 20B shows a second tiling embodiment, using four sub-images, but provides more robust coverage of frequency space (fewer missed spatial frequencies in the regions where the circles abut). The central circle is the same as in the previous example, illumination at normal incidence and collection with a conventional 0.65 NA optical system. The second innermost set of circles corresponds to illumination at grazing incidence in air ($NA_{ill}$~1). The next innermost set corresponds to the same illumination condition, but to collection through a glass substrate. The final outermost set of circles corresponds to illumination at grazing incidence through the substrate and collection with the same grating to allow high spatial frequencies (collection of light scatted at angles beyond the critical angle in the glass). The disclosed exemplary embodiments provide an example of the flexibility offered by the IIM process. The choice of tiling strategy will depend on the object to be imaged. In general, it is best not to put a collection boundary in a region of high spectral intensity to minimize Gibbs effect oscillations of the observed sub-image structure. In addition, the strength of scattered spatial frequency components in the regions between the circles will be a factor in selecting an IIM tiling strategy.

It should be noted that the tiling with circular regions is not a requirement, but is convenient as a result of the symmetry of optical lenses. In some cases, a square aperture, which can be provided either optically or electronically during the subimage manipulations, can prove advantageous. In particular, a square aperture can be configured to provide more robust coverage at the boundaries between sub-images (e.g. two squares can match along the line, while two circles can only touch at a point). The tilings in FIG. 19B show some overlap regions. Several strategies are available for dealing with the multiple counting in frequency space that these overlaps imply. The simplest is just to remove the double counting in the computation of the sub-image combination. Alternatively, a graded transfer function can be applied in the region of the overlap to minimize artifacts from imperfect cancellation of Gibbs effect oscillations in the two sub-images. The simplest approach is to calculate the Fourier transform of the sub-image, apply appropriate filters and inverse transform back to real space. The apparatus of image signal processing is very rich, and many of its techniques can be applied to this image reconstruction problem.

Figure 21:
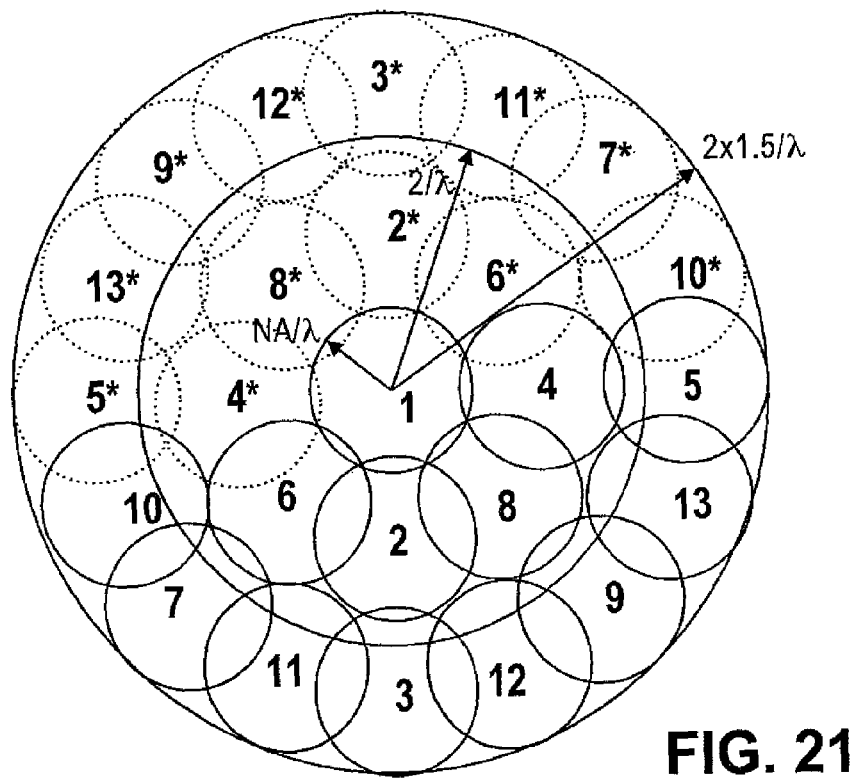
FIG. 21 show an exemplary tiling with almost complete frequency space coverage (NA=0.65, n=1.5), in accordance with present teachings.

For arbitrary images, where a-priori information on likely orientations and spatial frequency content is not available, for example biological specimens, additional sub-images can be used in order to get a more complete coverage of spatial frequency space. An example of covering most of spatial frequency space is given in FIG. 21. This consists of 13 sub-images: the two off-axis sub-images shown in the top of FIG. 20A are repeated with rotation angles of 45°, 90° and 135° (there is no need to repeat the low-frequency sub-image) for a total of 9 sub-images; additional high frequency subimages at rotation angles of 22.5°, 67.5°, 112.5°, and 157.5°, for a total of 13 subimages, complete the coverage except for small regions near the outer periphery of frequency space. It should be noted that there are only three optical configurations; on-axis illumination (low frequency), middle frequency, and high frequency, the remaining sub-images are obtained by a simple sample rotation. Furthermore, provision can be made for illumination through the substrate for the middle and high frequency coverage as the sample is rotated.

Figure 22:
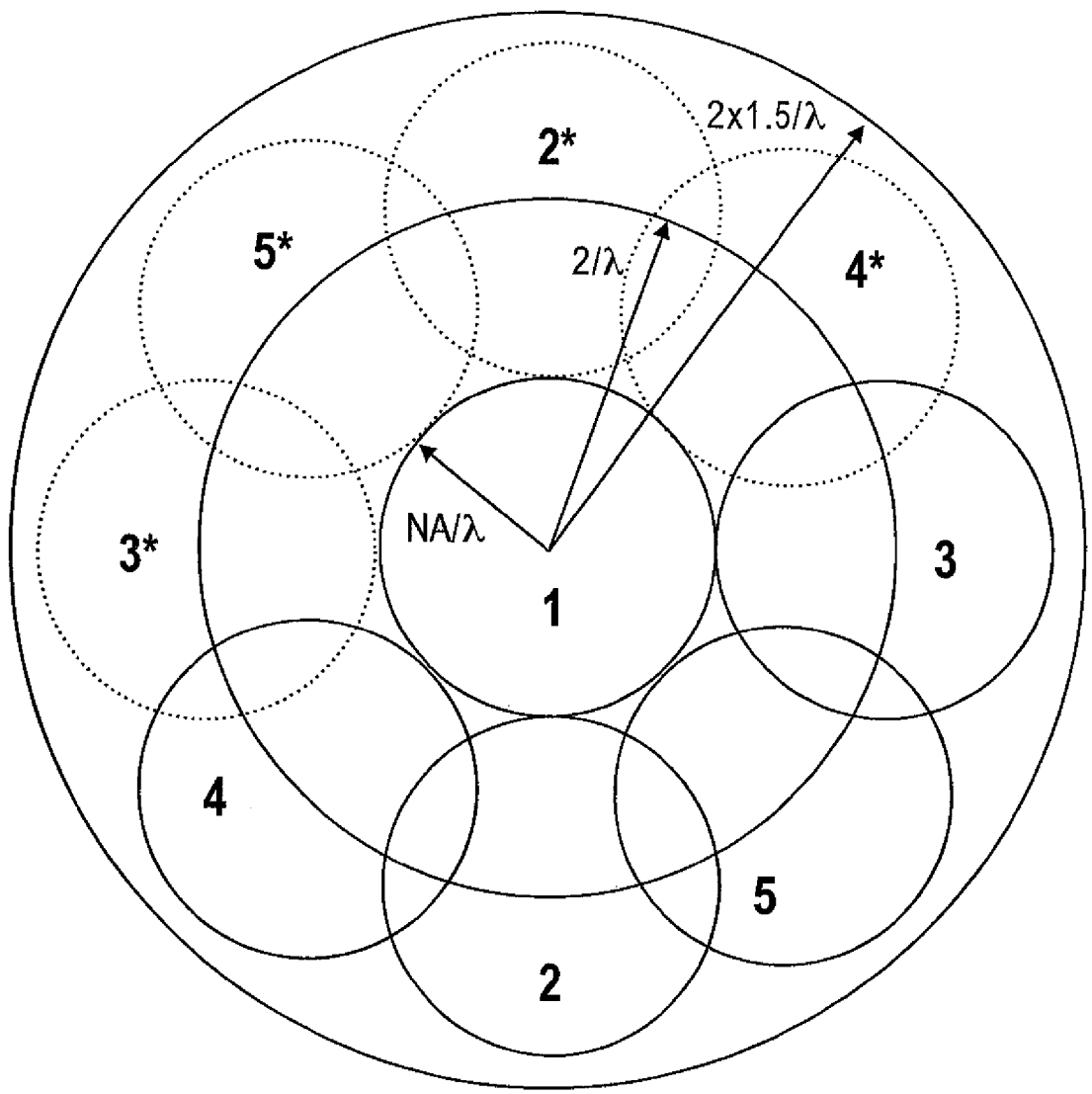
FIG. 22 show another exemplary tiling with a larger NA objective lens (NA=0.95, n=1.5), in accordance with various embodiments.

The number of sub-images can be reduced by increasing the objective NA. As can be seen in FIG. 22, the number of sub-images for nearly full coverage is reduced to 5 for a NA=0.95, corresponding to a very high NA air-based objective. The specifics of the arrangement is that the low frequency sub-image is taken for normal incidence ($NA_{ill}$=0); each of the offset sub-images is at $NA_{ill}+G/\lambda=2$ which can be achieved with grazing incidence illumination through the substrate along with a grating with a period of $\lambda/0.5$.

Figure 23:
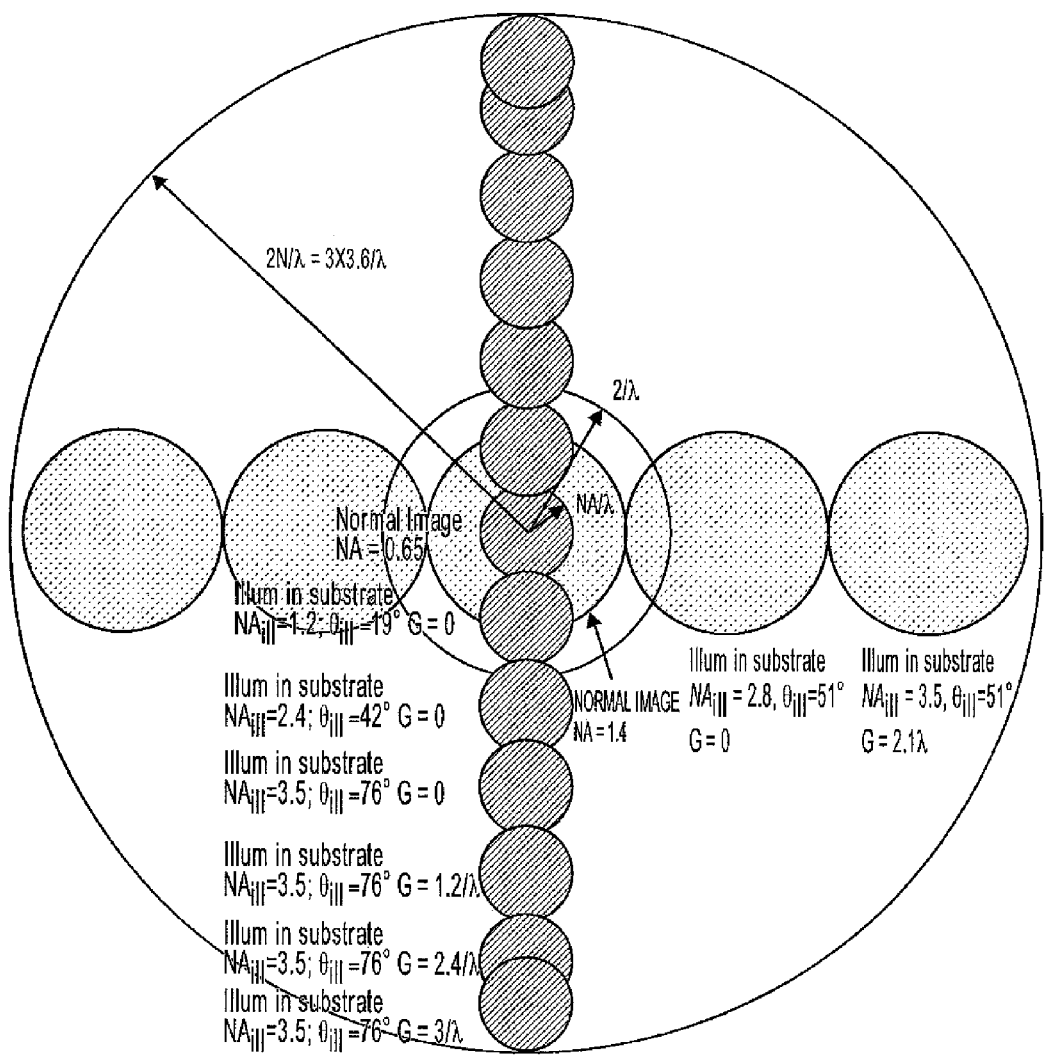
FIG. 23 show another exemplary tiling strategy for high index substrate (n=3.6, collection NA=0.65, as in FIG. 18), in accordance with various embodiments.

FIG. 23 provides two similar 1D tiling strategies for a silicon substrate ($n_{sub}$=3.6 at 1064 nm), one (vertical) for a 0.65 NA and another (horizontal) for a 1.4 NA conventional immersion objective. As many as seven sub-images may be used to provide a complete coverage along just one axis for the 0.65 NA, whereas only three are sufficient for the large NA. The area of frequency space, and the required number of sub-images for nearly complete coverage, increases as $n^2$. Scaling from FIG. 20A suggests that as many as $(3.6/1.5)^2 \times 13$~75 sub-images would be required for full coverage with the 0.64 NA objective. This suggests that there will be great advantage in knowing something about the image and its spectral content. One situation where this is clearly possible is in the inspection of silicon integrated circuits. The demands of manufacturable lithography at the nanoscale are forcing lithographers to restrict the range of patterns allowed in modern integrated circuits. This is often referred to as lithography "friendly" design, which in general is forcing the patterns closer to periodic grating patterns. In turn, a lithography "friendly" circuit is a microscopy "friendly" circuit with a limited range of spatial frequencies, hence complete coverage of spatial frequency space is not required to reconstruct an image. Immersion lenses are not available at an NA corresponding to the refractive index of silicon (3.6). An available immersion lens designed for more modest NAs of ~1.4 can be used with the addition of gratings to couple the higher spatial frequency light out of the substrate. An issue with the very high NA immersion lens is that these lenses typically have a very short working distance, which in turn will require a very thin substrate, or a specially designed objective.

Imaging interferometric microscopy techniques as described above are sensitive to the optical refractive index variation of the object materials and does not contain any material specific information. Imaging interferometric microscopy can be applied to get material and chemical information using coherent anti-Stokes Raman scattering (CARS) spectroscopic microscopy. An apparatus for coherent anti-Stokes Raman (CARS) microscopy can include any suitable optical arrangement as shown in FIGS. 1, 3, 5A-5E, 12A, 12B

13A-13C, 18, and 19. In particular, the apparatus for CARS microscopy can include an object plane 122, 222, 1222, 1822 on which can be disposed a first surface of a planar substrate 125, 225, 1225, 1825, wherein the substrate 125, 225, 1225, 1825 can be characterized by a homogeneous refractive index ($n_{sub}$) and a surface normal 226, 1226, 1826. The apparatus for CARS microscopy can also include a first optical system disposed to provide a illumination of the object plane 122, 222, 1222, 1822, the illumination characterized by two substantially coincident coherent beams 110, 110', 210, 210', with wavelengths $\lambda_1$ and $\lambda_2$ and corresponding angular frequencies $\omega_1$ and $\omega_2$ with $\omega_1 > \omega_2$, a radius of curvature, and disposed at one of a plurality of incident wave vectors from about 0 to about $2\pi n_{sub}/\lambda_1$ with respect to a surface normal of the substrate 125, 225, 1225, 1825 and at a multiplicity of azimuth angles spanning 0 to $2\pi$. The apparatus for CARS microscopy can also include a second optical system (collection) 130, 230, 530, 1230, 1830 having an optical axis 136, 236, 536, 1236, 1836 disposed at one of a plurality of center wave vectors from about 0 to about $2\pi n_{sub}/\lambda_1$ with respect to the surface normal, wherein the second optical system 130, 230, 530, 1230, 1830 is characterized by a numerical aperture (NA) and is responsive primarily to optical signals at frequencies greater than $\omega_1$. The apparatus for CARS microscopy can further include a third optical system disposed in an optical path of the first optical system to provide interferometric reintroduction of a reference illumination (reference beam) at a frequency of $2\omega_1 - \omega_2$, into the second optical system 130, 230, 530, 1230, 1830, wherein each of an amplitude, a phase, a radius of curvature and an angle of incidence of the reference is adjusted as required such that a corrected reference wave is present at the image plane of the second optical system 130, 230, 530, 1230, 1830. The apparatus for CARS microscopy can also include an electronic image device disposed at an image plane 124, 224 of the second optical system 130, 230, 530, 1230, 1830 that responds linearly to the local optical intensity and transfers the local optical intensity map across the image plane (a sub-image) to a signal processor device in electronic form, a signal processor that receives the electronic form of the subimage and manipulates the sub-image to correct for distortions and alteration introduced by the optical configuration, and an electronic device to sequentially collect, store and combine a plurality of sub-images corresponding to a plurality of regions of spatial frequency space to create a composite image, wherein the plurality of sub-images are formed as a result of adjustments to the first, the second, and the third optical systems.

In various embodiments, the third optical system of the apparatus for CARS microscopy can include a first beamsplitter disposed in the optical path of the first optical system before the object plane 122, 222, 1222, 1822 to collect a portion of the coherent illumination and one or more optics disposed between the first optical system and the second optical system 130, 230, 530, 1230, 1830, wherein the optics includes a nonresonant nonlinear material configured to generate the anti-Stokes four-wave mixing frequency $2\omega_1 - \omega_2$ and exclude the fundamental frequencies ($\omega_1$ and $\omega_2$), and to interferometrically reintroduce the portion of the anti-Stokes coherent illumination as a reference beam into the second optical system 130, 230, 530, 1230, 1830 in a position after the exit aperture of a collection (objective) lens, wherein the reintroduction is at one of a position corresponding to a position a zero-order beam would have had if it had been transmitted through an appropriate higher NA lens of the second optical system 130, 230, 530, 1230, 1830 as shown in FIG. 1 or an aliased position to reduce pixel requirements of the electronic image device, wherein the signal processor is adjusted to compensate for this spatial frequency aliasing.

In various embodiments, the third optical system of the apparatus for CARS microscopy can include one of the third optical system configurations shown in FIGS. 5A-5E. In some embodiments, the apparatus for CARS microscopy can include a third optical system 500E in a configuration shown in FIG. 5E. The third optical system can include a first beamsplitter disposed in the optical path of the first optical system before the object plane 522 to collect a portion of the coherent illumination one or more transfer optics disposed between the first optical system and the second optical system 530, wherein the optics includes a nonresonant nonlinear material 520 configured to generate the anti-Stokes four-wave mixing frequency $2\omega_1 - \omega_2$ and exclude the fundamental frequencies ($\omega_1$ and $\omega_2$), and a second beamsplitter 570 disposed between the object plane 522 and a front aperture of a collection lens (objective) of the second optical system 530 to reintroduce the portion of the anti-Stokes coherent wave illumination as a reference beam 510' into the second optical system 530 at an angle $\theta$ less than the entrance angular aperture ($<\sim\sin^{-1}$ NA) of the second optical system 530.

In other embodiments, the apparatus for CARS microscopy can include a third optical system 500D in a configuration shown in FIG. 5D. The third optical system 500D can further include a first beamsplitter disposed in the optical path of the first optical system to collect a portion of the coherent illumination, one or more transfer optics disposed between the first optical system and the second optical system, wherein the optics includes a nonresonant nonlinear material configured to generate the anti-Stokes four-wave mixing frequency $2\omega_1 - \omega_2$ and exclude the fundamental frequencies ($\omega_1$ and $\omega_2$). The third optical system 500D can also include at least one of a grating 584 or a grating on a waveguide disposed between the object plane 522 and a front aperture of the collection lens (objective) of the second optical system 530 to reintroduce the portion of the anti-Stokes coherent wave illumination as a reference beam 510' into the second optical system 530 at an angle $\theta$ less than the entrance angular aperture ($<\sim\sin^{-1}$ NA) of the second optical system 530.

In other embodiments, the apparatus for CARS microscopy can include a third optical system 500A in a configuration shown in FIG. 5A. The third optical system 500A can further include a first beamsplitter disposed in the optical path of the first optical system to collect a portion of the coherent illumination, one or more transfer optics, wherein the one or more optics can include a nonresonant nonlinear material configured to generate the anti-Stokes four-wave mixing frequency $2\omega_1 - \omega_2$ and exclude the fundamental frequencies ($\omega_1$ and $\omega_2$) and wherein at least one of the one or more optics is disposed to direct the portion of the anti-Stokes coherent plane wave illumination as a reference beam to illuminate the object at an angle $\theta$ corresponding to less than the entrance angular aperture ($<\sim\sin^{-1}$ NA) of the second optical system 530. The third optical system 500A can also include a dynamic (on/off) physical block 550 disposed in a back pupil plane of the second optical system 530 to alternately block and unblock a small portion of the pupil aperture corresponding to the position of the reference beam 510' in the aperture.

In various embodiments, the apparatus for CARS microscopy can include a third optical system 500C in a configuration shown in FIG. 5C. The third optical system 500C can further include a first beamsplitter disposed in the optical path of the first optical system to collect a portion of the coherent illumination, one or more transfer optics, wherein the one or more optics can include a nonresonant nonlinear material configured to generate the anti-Stokes four-wave mixing frequency $2\omega_1-\omega_2$ and exclude the fundamental frequencies ($\omega_1$ and $\omega_2$) and wherein at least one of the one or more optics is disposed to direct the portion of the anti-Stokes coherent plane wave illumination as a reference beam to illuminate the object at an angle θ corresponding to less than the entrance angular aperture ($<\sim\sin^{-1}$ NA) of the second optical system 530. The third optical system 500C can also include a guided-mode resonance filter (k-vector filter) 582 disposed between the object plane 522 and a collection lens of the second optical system 530 and an another device (not shown) to adjust the position, tilt and rotation of the guided-mode resonance filter 582 between positions, tilts and rotations in which it alternately transmits and blocks the portion of the reference beam transmitted through the object plane.

In certain embodiments, the apparatus for CARS microscopy can also include at least one known reference object to cover a small part of the image field. In some embodiments, the first, the second, and the third optical systems can be arranged in a transmission configuration.

In other embodiments, the first, the second, and the third optical systems can be arranged in a reflection configuration. In some embodiments, the plurality of incident wave vectors of the first optical system can include wave vectors less than about $2\pi/\lambda_1$ wherein these wave vectors are accessed by illumination of the substrate at polar angles between 0 and $\pi/2$. In other embodiments, the plurality of incident wave vectors of the first optical system can include wave vectors between about $2\pi/\lambda_1$ and about $2\pi n_{sub}/\lambda_1$, wherein these wave vectors are accessed by evanescent wave illumination of the object through the substrate. Furthermore, the apparatus for CARS microscopy can use any of the arrangements shown in FIGS. 13A-13C for coupling light into the substrate for illumination through the substrate 125, 225, 1225, and 1825.

In some other embodiments, the plurality of center wave vectors of the second optical system 130, 230, 530, 1230, 1830 can include only center wave vectors less than about $2\pi/\lambda$, wherein these center wave vectors are accessed by an optical system above the object plane of the substrate 125, 225, 1225, 1825. In certain embodiments, the plurality of center wave vectors of the second optical system 130, 230, 530, 1230, 1830 can include center wave vectors between $2\pi/\lambda_1$ and $2\pi n_{sub}/\lambda_1$, wherein the center wave vectors greater than $2\pi/\lambda_1$ are accessed through the substrate 125, 225, 1225, 1825 and the second optical system 130, 230, 530, 1230, 1830 can include one or more gratings on the side of the planar substrate 125, 225, 1225, 1825 opposite the object plane 122, 222, 1222, 1822, wherein each grating is characterized by a position, a pitch, and a grating profile.

According to various embodiments, there is a method for coherent anti-Stokes Raman (CARS) microscopy. The method for CARS microscopy can include providing an object 120, 220, 1220, 1820 disposed over a planar substrate 125, 225, 1225, 1825, wherein the substrate 125, 225, 1225, 1825 is characterized by a homogeneous refractive index ($n_{sub}$) and a surface normal and providing a first optical system disposed to provide a illumination of the object plane 122, 222, 1222, 1822, the illumination characterized by two substantially coincident coherent beams with wavelengths $\lambda_1$ and $\lambda_2$ and corresponding angular frequencies $\omega_1$ and $\omega_2$ with $\omega_1>\omega_2$, a radius of curvature, and disposed at one of a plurality of incident wave vectors from about 0 to about $2\pi n_{sub}/\lambda_1$ with respect to a surface normal 126, 226, 1226, 1826 of the substrate 125, 225, 1225, 1825 and at a multiplicity of azimuth angles spanning 0 to $2\pi$. The method can also include providing a second optical system (collection) 130, 230, 1230, 1830 having an optical axis 136, 236, 1236, 1836 disposed at one of a plurality of center wave vectors from about 0 to about $2\pi n_{sub}/\lambda_1$ with respect to the surface normal 125, 225, 1225, 1825, wherein the second optical system 130, 230, 1230, 1830 is characterized by a numerical aperture (NA) and is responsive primarily to optical signals at frequencies greater than $\omega_1$ and providing a third optical system disposed in an optical path of the first optical system to provide interferometric reintroduction of a reference illumination (reference beam) at a frequency of $2\omega_1-\omega_2$, into the second optical system 130, 230, 1230, 1830, wherein each of an amplitude, a phase, a radius of curvature and an angle of incidence of the reference is adjusted as required such that a corrected reference wave is present at the image plane of the second optical system 130, 230, 1230, 1830. The method can further include providing an electronic image device disposed at an image plane of the second optical system 130, 230, 1230, 1830 that responds linearly to the local optical intensity and transfers the local optical intensity map across the image plane (a sub-image) to a signal processor device in electronic form, providing a signal processor that receives the electronic form of the sub-image, manipulating the sub-image using the signal processor to correct for distortions and alteration introduced by the optical configuration, providing an electronic device to sequentially collect, store and combine a plurality of sub-images corresponding to a plurality of regions of spatial frequency space to create a composite image, wherein the plurality of sub-images are formed as a result of adjustments to the first, the second, and the third optical systems, and combining the plurality of sub-images into a composite image to provide a substantially faithful image of the object 120, 220, 1220, 1820.

According to various embodiments, the method can further include one or more processes of subtraction of dark field images, subtraction of background images, shifting of spatial frequencies in accordance with the optical configuration, and elimination of one or more overlapping coverages of the frequency space wherein the elimination operations can be performed either in the optical systems or in the signal processing. In some embodiments, the method can further include selecting regions of spatial frequency space to provide a more or less faithful image of the object 120, 220, 1220, 1820 in the object plane 122, 222, 1222, 1822.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for microscopy comprising:
    an object plane on which is disposed a first surface of a substrate, wherein the substrate is characterized by a homogeneous refractive index and a surface normal and wherein the substrate is arranged to support an object;

a first optical system disposed to provide a substantially coherent illumination of the object plane, the illumination characterized by a wavelength $\lambda$ and a radius of curvature and disposed at one of a plurality of incident wave vectors from about 0 to about $2\pi/\lambda$ with respect to the surface normal of the substrate and at a plurality of azimuth angles spanning 0 to $2\pi$;

a second optical system disposed to collect portions of the illumination scattered from the object plane, the second optical system having an optical axis disposed at one of a plurality of angles from about 0 to about $\pi$ with respect to the surface normal of the substrate and at the azimuth angle corresponding to the illumination of the first optical system, wherein the second optical system is characterized by a numerical aperture;

a third optical system disposed between the first optical system and an entrance aperture of a first optical element of the second optical system to provide interferometric reintroduction of a portion of the coherent illumination as a reference beam into the second optical system, wherein each of an amplitude, a phase, a radius of curvature, a path length, and an angle of incidence of the reference beam is adjusted such that a correct reference beam is present at an image plane of the second optical system;

an electronic image device disposed at the image plane of the second optical system that responds linearly to a local optical intensity and transfers a local optical intensity map across the image plane as a sub-image to a signal processor device in electronic form;

a set of devices for adjusting the first, the second, and the third optical systems to collect sub-images for different pairs of the pluralities of incident illumination wave vectors from the first optical system and collection angles from the vectors from the second optical system so as to sequentially obtain a plurality of sub-images corresponding to a plurality of regions of spatial frequency space; and the signal processor device arranged to sequentially receive the electronic form of the sub-images and manipulate the sub-images to correct for distortions and alterations introduced by the optical configuration, store, and combine the plurality of sub-images corresponding to the plurality of regions of spatial frequency space to create a composite image.

2. The apparatus of claim 1, wherein the third optical system further comprises:
a first beamsplitter disposed in the optical path of the first optical system to collect a portion of the coherent illumination;
one or more transfer optics arranged to direct the portion of the coherent illumination around the object plane; and
a second beamsplitter disposed between the object plane and a front aperture of a collection lens of the second optical system to reintroduce the portion of the coherent illumination as a reference beam into the second optical system at an angle less than the entrance angular aperture of the second optical system.

3. The apparatus of claim 1, wherein the third optical system further comprises:
a first beamsplitter disposed in the optical path of the first optical system to collect a portion of the coherent illumination;
one or more transfer optics arranged to direct the portion of the coherent illumination around the object plane; and
at least one of a grating or a grating on a waveguide disposed between the object plane and a front aperture of the collection lens of the second optical system to reintroduce the portion of the coherent illumination as a reference beam into the second optical system at an angle less than the entrance angular aperture of the second optical system.

4. The apparatus of claim 1, wherein the third optical system further comprises:
a first beamsplitter disposed in the optical path of the first optical system to collect a portion of the coherent illumination;
one or more optical components to direct the portion of the coherent illumination as the reference beam to illuminate the object at an angle less than the entrance angular aperture of the second optical system; and
a dynamic physical block disposed in a back pupil plane of the second optical system to alternately block and unblock a portion of a pupil aperture corresponding to the position of the reference beam in the aperture.

5. The apparatus of claim 1, wherein the third optical system further comprises:
a first beamsplitter disposed in the optical path of the first optical system to collect a portion of the coherent illumination; and
one or more optical components to direct the portion of the coherent illumination as the reference beam to illuminate the object plane at an angle less than the entrance angular aperture of the second collection optical system;
a guided-mode resonance filter disposed between the object plane and a collection lens of the second optical system; and
an another device to adjust the position, tilt, and rotation of the guided-mode resonance filter between positions, tilts, and rotations in which it alternately transmits and blocks the portion of the reference beam transmitted through the object plane.

6. The apparatus of claim 1, wherein the first, the second, and the third optical systems are arranged in at least one of a transmission configuration and a reflection configuration.

7. The apparatus of claim 1, wherein the third optical system further comprises:
a first beamsplitter disposed in the optical path of the first optical system to collect a portion of the coherent illumination;
one or more optical components to direct the portion of the coherent illumination as the reference beam to illuminate the object plane at an angle less than the entrance angular aperture of the second collection optical system;
a prism disposed between the object plane and the entrance aperture of the second optical system to adjust the angle of the reference beam transmitted by the object with reference to the acceptance angular aperture of the second collection optical system; and
an another device to adjust the tilt of the prism to alternately shift all of the diffracted beams incident on the second optical system such that the reference beam is alternately transmitted and blocked by the entrance aperture of the second optical system.

8. A method for microscopy comprising:
providing an object disposed over a planar substrate, wherein the substrate is characterized by a homogeneous refractive index and a surface normal;
providing a first optical system to illuminate the object with substantially coherent illumination, the illumination characterized by a wavelength $\lambda$ and a radius of curvature and disposed at one of a plurality of incident wave vectors from about 0 to about 2π/λ with respect to a surface normal of the substrate and at a plurality of azimuth angles spanning from about 0 to about 2π;

providing a second optical system disposed to collect portions of the illumination scattered from the object, the second optical system having an optical axis disposed at one of a plurality of angles from about 0 to about π with respect to the substrate surface normal and at the azimuth angle corresponding to the illumination of the first optical system, wherein the second optical system is characterized by a numerical aperture;

providing a third optical system disposed between the optical path of the first optical system and an entrance aperture of a first optical element of the second optical system to provide interferometric reintroduction of a portion of the coherent illumination as a reference beam into the second optical system, wherein each of an amplitude, a phase, a radius of curvature and an angle of incidence of the reference is adjusted as required such that a correct reference wave is present at an image plane of the second optical system;

recording a sub-image of the object at an object plane using an electronic image device, wherein the sub-image is formed as a result of interference between the scattering resulting from the coherent illumination of the object and the reference beam;

adjusting the first, the second, and the third optical systems to collect a plurality of sub-images corresponding to a plurality of regions of spatial frequency space;

manipulating each of the plurality of sub-images using a signal processor to correct for distortions and alterations introduced by the optical configuration; and combining the plurality of sub-images into a composite image to provide an image of the object.

9. The method for microscopy, according to claim 8, wherein providing a third optical system further comprises:
collecting a portion of the coherent illumination using a beam splitter disposed in the optical path of the first optical system;
providing one or more transfer optics to direct the portion of the coherent illumination around the object plane;
reintroducing the portion of the coherent illumination as the reference beam into the second optical system at an angle less than the entrance angular aperture of the second optical system using a second beamsplitter disposed between the object plane and a collection lens of the second optical system; and
alternately blocking and unblocking the portion of the coherent reference beam to obtain first a dark field image of the object and second a bright field image including the information on the phases of the light scattered by the object from the illumination to the second optical system.

10. The method of microscopy, according to claim 9, wherein the angle is adjusted to be close to, but less than, about the entrance angular aperture of the second optical system.

11. The method for microscopy, according to claim 8, wherein providing a third optical system comprises:
collecting a portion of the coherent illumination using a beam splitter disposed in the optical path of the first optical system;
providing one or more transfer optics to direct the portion of the coherent illumination around the object plane; and
reintroducing the portion of the coherent illumination as the reference beam into the second optical system at an angle less than the entrance angular aperture of the second optical system using at least one of a grating or a grating on a waveguide disposed between the object plane and a collection lens of the second optical system.

12. The method of microscopy, according to claim 11, wherein the angle is adjusted to be close to, but less than, the entrance angular aperture of the second optical system.

13. The method for microscopy, according to claim 8, wherein providing a third optical system comprises:
collecting a portion of the coherent illumination using a beam splitter disposed in the optical path of the first optical system;
directing the portion of the coherent illumination as the reference beam to illuminate the object at an angle less than the entrance angular aperture of the second optical system using one or more optical components; and
alternately blocking and unblocking a small portion of a back pupil aperture of the second optical system corresponding to the position of the reference beam in the aperture using a dynamic physical block disposed in a back pupil plane of the second optical system.

14. The method of claim 13 wherein the angle is chosen to be close to, but less than, the entrance angular aperture of the second optical system.

15. The method of claim 13 wherein the angle is chosen to be close to, but less than, the entrance angular aperture of the second optical system.

16. The method for microscopy, according to claim 8, wherein providing a third optical system comprises:
collecting a portion of the coherent illumination by splitting the coherent illumination using a beam splitter disposed in the optical path of the first optical system;
directing the portion of the coherent illumination as the reference beam to illuminate the object at an angle less than the entrance angular aperture of the second optical system using one or more optical components between the first optical system and the second optical system; and
alternately blocking and unblocking the transmission of the reference beam by adjusting the position, tilt and rotation of a guide-mode resonance filter disposed between the object and a collection lens of the second optical system.

17. The method for microscopy, according to claim 8, wherein providing the first, the second, and the third optical systems comprises providing the first, the second, and the third optical systems in at least one of a transmission configuration and a reflection configuration.

18. The method for microscopy, according to claim 8 further comprising one or more processes of subtraction of dark field images, subtraction of background images, shifting of spatial frequencies in accordance with the optical configuration, and elimination of one or more overlapping coverages of the frequency space wherein the elimination operations can be performed either in the optical systems or in the signal processing.

19. The method for microscopy, according to claim 8, further comprising selection of the regions of spatial frequency space to provide a more or less faithful image of the object in the object plane.

20. The method of claim 8, wherein providing the third optical system further comprises:
collecting a portion of the coherent illumination using a beamsplitter disposed in the optical path of the first optical system;
providing one or more optical components to direct the portion of the coherent illumination as the reference beam to illuminate the object plane at an angle less than the entrance angular aperture of the second collection optical system;

adjusting the angle of the reference beam transmitted by the object with reference to the acceptance angular aperture of the second collection optical system using a prism disposed between the object plane and the entrance aperture of the second optical system; and adjusting the tilt of the prism to alternately shift all of the diffracted beams incident on the second optical system such that the reference beam is alternately transmitted and blocked by the entrance aperture of the second optical system.

21. An apparatus for microscopy comprising:

an object plane on which is disposed a first surface of a substrate, wherein the substrate is characterized by a homogeneous refractive index ($n_{sub}$) and a surface normal and wherein the substrate is arranged to support an object;

a first optical system disposed to provide an evanescent wave illumination of the object plane by providing a substantially coherent illumination of the object plane, the illumination characterized by a wavelength $\lambda$ and a radius of curvature and disposed at one of a plurality of incident wave vectors from about $2\pi/\lambda$ to about $2\pi n_{sub}/\lambda$ with respect to a surface normal of the substrate and at a multiplicity of azimuth angles spanning 0 to $2\pi$, wherein the plurality of incident wave vectors correspond to angles beyond a total internal reflection angle of the substrate;

a second optical system disposed to collect portions of the illumination scattered from the object plane, the second optical system having an optical axis disposed at one of a plurality of angles from about 0 to about $\pi$ with respect to the surface normal of the substrate and at the azimuth angle corresponding to the illumination of the first optical system, wherein the second optical system is characterized by a numerical aperture;

a third optical system disposed in the first optical system to provide interferometric reintroduction of a portion of the coherent illumination as a reference beam into the second optical system, wherein each of an amplitude, a phase, a radius of curvature, a path length, and an angle of incidence of the reference beam is adjusted as required such that a correct reference wave is present at the image plane of the second optical system;

an electronic image device disposed at an image plane of the second optical system that responds linearly to a local optical intensity and transfers a local optical intensity map across the image plane as a sub-image to a signal processor device in electronic form;

a device for adjusting the first, the second, and the third optical systems to collect sub-images for different pairs of the pluralities of incident illumination wave vectors from the first optical system and collection center wave vectors from the second optical system so as to obtain a plurality of sub-images corresponding to a plurality of regions of spatial frequency space; and the signal processor device arranged to receive the electronic form of the sub-images and manipulate the sub-images to correct for distortions and alterations introduced by the optical configuration, store, and combine the plurality of sub-images corresponding to the plurality of regions of spatial frequency space to create a composite image.

22. The apparatus of claim 21, wherein the third optical system further comprises:

a first beamsplitter disposed in the optical path of the first optical system before the object to collect a portion of the coherent illumination; and one or more optics disposed between the first optical system and the second optical system to interferometrically reintroduce the portion of the coherent illumination as the reference beam into the second optical system in a position after the exit aperture of a collection lens, wherein the reintroduction is at one of a position corresponding to a position a zero-order beam would have had if it had been transmitted through a higher numerical aperture lens of the second optical system or an aliased position to reduce pixel requirements of the electronic image device, wherein the signal processor is arranged to compensate for this spatial frequency aliasing.

23. The apparatus of claim 21, wherein the third optical system further comprises:

a first beamsplitter disposed in the optical path of the first optical system to collect a portion of the coherent illumination;

one or more transfer optics disposed between the first optical system and the second optical system to direct the portion of the coherent illumination around the object plane; and a second beamsplitter disposed between the object plane and the collection lens of the second optical system to reintroduce the portion of the coherent illumination as the reference beam into the second optical system at an angle less than the entrance angular aperture of the second optical system.

24. The apparatus of claim 21, wherein the third optical system further comprises:

a first beamsplitter disposed in the optical path of the first optical system to collect a portion of the coherent plane wave illumination;

one or more transfer optics arranged to direct a portion of the coherent illumination around the object; and at least one of a grating or a grating on a waveguide disposed between the object and a collection lens of the second optical system to reintroduce the portion of the coherent illumination as the reference beam into the second optical system at an angle less than the entrance angular aperture of the second optical system.

25. The apparatus of claim 21, wherein the third optical system further comprises:

a first beamsplitter disposed in the first optical system to collect a portion of the coherent plane wave illumination; and one or more transfer optical components to direct the portion of the coherent illumination as the reference beam to illuminate the object at an angle less than the entrance angular aperture of the second optical system; and a dynamic physical block disposed in a back pupil plane of the second optical system to alternately block and unblock a portion of a pupil aperture, wherein the portion corresponds to the position of the reference beam in the aperture.

26. The apparatus of claim 21, wherein the third optical system further comprises:

a first beamsplitter disposed in the optical path of the first optical system to collect a portion of the coherent plane wave illumination; and one or more transfer optical components arranged to direct the portion of the coherent illumination as the reference beam;

a guided mode resonance filter disposed between the object plane and an entrance aperture of the second optical system; and an another device to adjust the position, tilt and rotation of a guided-mode resonance filter between positions, tilts and rotations in which it sequentially transmits and blocks the portion of the reference beam transmitted through the object plane.

27. The apparatus of claim 21, wherein the third optical system further comprises:

a first beamsplitter disposed in the optical path of the first optical system to collect a portion of the coherent illumination;

one or more optical components to direct the portion of the coherent illumination as the reference beam to illuminate the object plane at an angle less than the entrance angular aperture of the second collection optical system;

a prism disposed between the object plane and the entrance aperture of the second optical system to adjust the angle of the reference beam transmitted by the object with reference to the acceptance angular aperture of the second collection optical system; and an another device to adjust the tilt of the prism to alternately shift all of the diffracted beams incident on the second optical system such that the reference beam is alternately transmitted and blocked by the entrance aperture of the second optical system.

28. A method for microscopy comprising:

providing an object disposed over a surface of a planar substrate characterized by a homogeneous refractive index ($n_{sub}$) and a surface normal;

providing a first optical system disposed to provide an evanescent wave illumination of the object by providing a substantially coherent illumination of the object, the illumination characterized by a wavelength $\lambda$ and a radius of curvature and disposed at one of a plurality of incident wave vectors from about $2\pi/\lambda$ to about $2\pi n_{sub}/\lambda$ with respect to a surface normal of the substrate and at a multiplicity of azimuth angles spanning 0 to $2\pi$, wherein the plurality of incident wave vectors correspond to angles beyond a total internal reflection angle $\theta_c$ of the substrate;

providing a second optical system having an optical axis disposed at one of a plurality of angles from about 0 to about $\pi$ with respect to the surface normal, wherein the second optical system is characterized by a numerical aperture;

providing a third optical system disposed in an optical path of the first optical system to provide interferometric reintroduction of a portion of the coherent illumination as a reference beam into the second optical system, wherein an amplitude, a phase, and a position of the reintroduced illumination in an image plane of the second optical system are arranged to be adjusted;

recording a sub-image of the object at an object plane using an electronic image device, wherein the sub-image is formed as a result of the interference of the light scattered from coherent illumination by the object and the reference beam;

adjusting the first, the second, and the third optical systems to sequentially collect a plurality of sub-images corresponding to a plurality of regions of spatial frequency space;

manipulating each of the plurality of sub-images using a signal processor to correct for distortions and alterations introduced by the optical configuration; and combining the plurality of sub-images into a composite image to provide an image of the object.

29. The method for microscopy, according to claim 28, wherein providing a third optical system further comprises:

collecting a portion of the coherent illumination by splitting the coherent illumination using a beam splitter disposed in the optical path of the first optical system; and interferometrically reintroducing the portion of the coherent illumination as a reference beam after an exit aperture of a collection lens of the second optical system, wherein the reintroduction is at one of a position, an amplitude, a phase, a radius of curvature, a path length, and an angle of incidence onto the image plane either that a zero-order beam would have had if it had been transmitted through a higher numerical aperture lens of the second optical system or an aliased angle of incidence to reduce pixel requirements of the electronic image device, wherein the signal processor is arranged to compensate for this spatial frequency aliasing.

30. The method for microscopy, according to claim 28, wherein providing a third optical system further comprises:

collecting a portion of the coherent illumination using a first beam splitter disposed in the optical path of the first optical system; and reintroducing the portion of the coherent illumination as a reference beam into the second optical system at an angle less than the entrance angular aperture of the second optical system using a second beamsplitter disposed between the object and an entrance aperture of a collection lens of the second optical system, wherein the reintroduction is at one of a position, an amplitude, a phase, a radius of curvature, a path length, and an aliased angle of incidence onto the image plane, wherein the signal processor is adjusted to compensate for this spatial frequency aliasing.

31. The method for microscopy, according to claim 28, wherein providing a third optical system comprises:

collecting a portion of the coherent illumination using a first beam splitter disposed in the optical path of the first optical system; and reintroducing the portion of the coherent illumination as a reference beam into the second optical system at an angle less than an entrance angular aperture of the second optical system using at least one of a grating or a grating on a waveguide disposed between the object and a collection lens of the second optical system.

32. The method for microscopy, according to claim 28, wherein the step of providing a third optical system comprises:

collecting a portion of the coherent illumination using a first beam splitter disposed in the optical path of the first optical system;

directing the portion of the coherent illumination as a reference beam to illuminate the object at an angle less than the entrance angular aperture of the second optical system using one or more optical components disposed between the first optical system and the second optical system; and alternately blocking and unblocking a portion of a pupil aperture of the second optical system corresponding to a position of the reference beam in the aperture using a dynamic physical block disposed in a back pupil plane of the second optical system.

33. The method of claim 32 wherein the angle at which the portion of the coherent illumination is directed is chosen to be close to, but less than the entrance angular aperture of the second optical system.

34. The method for microscopy, according to claim 28, wherein providing a third optical system comprises:
  collecting a portion of the coherent illumination by splitting the coherent illumination using a beam splitter disposed in the optical path of the first optical system;
  directing the portion of the coherent illumination as a reference beam to illuminate the object at an angle less than the entrance angular aperture of the second optical system using one or more optical components between the first optical system and the second optical system; and
  sequentially blocking and unblocking transmission of the reference beam using a guide-mode resonance filter disposed between the object and a collection lens of the second optical system.

35. The method of claim 34 wherein the angle at which the portion of the coherent illumination is directed is chosen to be close to, but less than the entrance angular aperture of the second optical system.

36. The method for microscopy, according to claim 28 further comprising one or more processes of subtraction of dark field images, subtraction of background images, shifting of spatial frequencies in accordance with the optical configuration, and elimination of one or more overlapping coverages of the frequency space wherein the elimination operations can be performed either in the optical systems or in the signal processing.

37. The method for microscopy, according to claim 28, further comprising selection of the regions of spatial frequency space to provide an image of the object in the object plane.

38. The method of claim 28, wherein providing the third optical system further comprises:
  collecting a portion of the coherent illumination using a beamsplitter disposed in the optical path of the first optical system;
  providing one or more optical components to direct the portion of the coherent illumination as the reference beam to illuminate the object plane at an angle less than the entrance angular aperture of the second collection optical system;
  adjusting the angle of the reference beam transmitted by the object with reference to the acceptance angular aperture of the second collection optical system using a prism disposed between the object plane and the entrance aperture of the second optical system; and
  adjusting the tilt of the prism to alternately shift all of the diffracted beams incident on the second optical system such that the reference beam is alternately transmitted and blocked by the entrance aperture of the second optical system.

39. An apparatus for microscopy comprising:
  an object plane on which is disposed a first surface of a planar substrate, wherein the substrate is characterized by a homogeneous refractive index ($n_{sub}$) and a surface normal, wherein the planar substrate is arranged to support an object;
  a first optical system disposed to provide a substantially coherent illumination of the object plane, the illumination characterized by a wavelength $\lambda$ and a radius of curvature and disposed at one of a plurality of incident wave vectors from about 0 to about $2\pi n_{sub}/\lambda$ with respect to a surface normal of the substrate and at a plurality of azimuth angles spanning 0 to $2\pi$;
  at least one grating on the side of the substrate opposite the object plane, each grating characterized by a period, a depth, a grating profile and a position to further transform reflected waves resulting from scattering of the coherent illumination of the object into propagating waves in a medium below the substrate;
  a second optical system having an optical axis disposed at one of a plurality of center wave vectors from about 0 to about $2\pi/\lambda$ with respect to the surface normal, wherein the second optical system comprises the gratings on the second side of the substrate and a collection lens that is characterized by a numerical aperture;
  a third optical system disposed in an optical path of the first optical system to provide interferometric reintroduction of a portion of the coherent illumination as a reference beam into the second optical system, wherein each of an amplitude, a phase, a radius of curvature, a path length, and an angle of incidence of the reference beam is arranged to be adjusted, wherein a correct reference wave is present at an image plane of the second optical system;
  an electronic image device disposed at the image plane of the second optical system that responds linearly to a local optical intensity and transfers a local optical intensity map across the image plane as a sub-image to a signal processor device in electronic form;
  a device for adjusting the first, the second, and the third optical systems to collect sub-images for different pairs of the pluralities of incident illumination wave vectors from the first optical system and collection center wave vectors from the second optical system so as to obtain a plurality of sub-images corresponding to a plurality of regions of spatial frequency space; and
  the signal processor device arranged to receive the electronic form of the sub-images and manipulate the sub-images to correct for distortions and alterations introduced by the optical configuration, store, and combine the plurality of sub-images corresponding to the plurality of regions of spatial frequency space to create a composite image.

40. The apparatus of claim 39, wherein the third optical system further comprises:
  a first beamsplitter disposed in the optical path of the first optical system before the object to collect a portion of the coherent illumination; and
  one or more optics disposed between the first optical system and the second optical system to interferometrically reintroduce the portion of the coherent illumination as a reference beam into the second optical system in a position after an exit aperture of a collection lens, wherein the reintroduction is at one of a position corresponding to a position a zero-order beam would have had if it had been transmitted through a higher numerical aperture lens of the second optical system or an aliased position to reduce pixel requirements of the electronic image device, wherein the signal processor is arranged to compensate for this spatial frequency aliasing.

41. The apparatus of claim 39, wherein the third optical system further comprises:
  a first beamsplitter disposed in the optical path of the first optical system to collect a portion of the coherent illumination;
  one or more transfer optics arranged to direct a portion of the coherent illumination around the object plane; and
  a second beamsplitter disposed between the object and a collection lens of the second optical system to reintroduce the portion of the coherent illumination as a reference beam into the second optical system at an angle less than an entrance angular aperture of the second optical system.

42. The apparatus of claim 39, wherein the third optical system further comprises:
   a first beamsplitter disposed in the optical path of the first optical system to collect a portion of the coherent illumination;
   one or more transfer optics to direct the portion of the coherent illumination around the object plane; and
   at least one of a grating or a grating on a waveguide disposed between the object and a collection lens of the second optical system to reintroduce the portion of the coherent plane wave illumination as a reference beam into the second optical system at an angle less than an entrance angular aperture of the second optical system.

43. The apparatus of claim 39, wherein the third optical system further comprises:
   a first beamsplitter disposed in the optical path of the first optical system to collect a portion of the coherent illumination; and
   one or more optical components disposed between the first optical system and the second optical system to direct the portion of the coherent illumination as a reference beam to illuminate the object at an angle less than an entrance angular aperture of the second optical system; and
   a dynamic physical block disposed in a back pupil plane of the second optical system to alternately block and unblock a portion of a pupil aperture corresponding to a position of the reference beam in the aperture.

44. The apparatus of claim 39, wherein the third optical system further comprises:
   a first beamsplitter disposed in the optical path of the first optical system to collect a portion of the coherent illumination; and
   one or more optical components disposed between the first optical system and the second optical system to direct the portion of the coherent illumination as a reference beam to illuminate the object at an angle less than an entrance angular aperture of said second collection optical system; and
   a guided-mode resonance filter disposed between the object and a collection lens of the second optical system to sequentially block and unblock transmission of the reference beam.

45. The apparatus of claim 39, wherein the third optical system further comprises:
   a first beamsplitter disposed in the optical path of the first optical system to collect a portion of the coherent illumination;
   one or more optical components to direct the portion of the coherent illumination as the reference beam to illuminate the object plane at an angle less than the entrance angular aperture of the second collection optical system;
   a prism disposed between the object plane and the entrance aperture of the second optical system to adjust the angle of the reference beam transmitted by the object with reference to the acceptance angular aperture of the second collection optical system; and
   an another device to adjust the tilt of the prism to alternately shift all of the diffracted beams incident on the second optical system such that the reference beam is alternately transmitted and blocked by the entrance aperture of the second optical system.

46. A method for microscopy comprising:
   providing an object disposed over a first side of a planar substrate, the substrate characterized by a homogeneous refractive index ($n_{sub}$) and a surface normal such that the object is separated from the substrate by a distance of no more than about the optical wavelength;
   providing a first optical system disposed to provide a substantially coherent illumination of the object, the illumination characterized by a wavelength $\lambda$ and a radius of curvature and disposed at one of a plurality of incident wavevectors from about 0 to about $2\pi n_{sub}/\lambda$ with respect to a surface normal of the substrate and at a plurality of azimuth angles spanning about 0 to about $2\pi$;
   providing a multiplicity of gratings on a second side of the substrate opposite the first side, each grating characterized by a position, a period, a depth, and a grating profile, wherein each of the multiplicity of gratings transforms reflected waves resulting from scattering of the coherent illumination by the object into propagating waves in a medium below the substrate;
   providing a second optical system having an optical axis disposed at one of a plurality of center angles from about 0 to about $\pi$ with respect to the surface normal, wherein the second optical system includes at least one grating on the second side of the substrate and is characterized by a numerical aperture;
   providing a third optical system disposed in an optical path of the first optical system to provide interferometric reintroduction of a portion of the coherent illumination as a reference beam into the second optical system, wherein each of an amplitude, a phase, a radius of curvature, a path length, and an angle of incidence of the reference is arranged to be adjusted such that a correct reference wave is present at an image plane of the second optical system;
   recording a sub-image of the object at an object plane using an electronic image device, wherein the sub-image is formed as a result of interference between the scattering resulting from the coherent illumination of the object and the reference beam;
   transferring the electronic image to a signal processor device;
   adjusting the first, the second, and the third optical systems to collect a plurality of sub-images corresponding to a plurality of regions of spatial frequency space;
   manipulating each of the plurality of sub-images using the signal processor device to correct for distortions and alterations introduced by the optical configuration; and
   combining the plurality of sub-images into a composite image to provide an image of the object.

47. The method for microscopy, according to claim 46, wherein providing a third optical system further comprises:
   collecting a portion of the coherent illumination by splitting the coherent illumination using a beam splitter disposed in the optical path of the first optical system; and
   interferometrically reintroducing the portion of the coherent illumination as a reference beam after an exit aperture of a collection lens of the second optical system, wherein the reintroduction is at one of a position, an amplitude, a phase, a radius of curvature, a path length, and an angle of incidence onto the image plane that either a zero-order beam would have had if it had been transmitted through a higher numerical aperture lens of the second optical system or an aliased angle of incidence to reduce pixel requirements of the electronic image device, wherein the signal processor is arranged to compensate for this spatial frequency aliasing.

48. The method for microscopy, according to claim 46, wherein providing a third optical system further comprises:

collecting a portion of the coherent illumination using a beam splitter disposed in the optical path of the first optical system;

providing one or more transfer optics to direct the portion of the coherent illumination around the object plane; and reintroducing the portion of the coherent illumination as a reference beam into the second optical system at an angle less than an entrance angular aperture of the second optical system using a second beamsplitter disposed between the object and a collection lens of the second optical system.

49. The method of claim 48 wherein the angle is chosen to be close to, but less than the entrance angular aperture of the second optical system.

50. The method for microscopy, according to claim 46, wherein providing a third optical system comprises:

collecting a portion of the coherent plane wave illumination using a beam splitter disposed in the optical path of the first optical system;

providing one or more transfer optics to direct the portion of the coherent illumination around the object plane; and reintroducing the portion of the coherent illumination as a reference beam into the second optical system at an angle less than an entrance angular aperture of the second optical system using at least one of a grating or a grating on a waveguide disposed between the object and a collection lens of the second optical system.

51. The method of claim 50 wherein the angle is chosen to be close to, but less than the entrance angular aperture of the second optical system.

52. The method for microscopy, according to claim 46, wherein providing a third optical system comprises:

collecting a portion of the coherent illumination using a beam splitter disposed in the optical path of the first optical system;

directing the portion of the coherent illumination as a reference beam to illuminate the object at an angle less than an entrance angular aperture of the second optical system using one or more optical components disposed between the first optical system and the second optical system; and alternately blocking and unblocking a portion of a pupil aperture corresponding to a position of the reference beam in the aperture using a dynamic physical block disposed in a back pupil plane of the second optical system.

53. The method of claim 52 wherein the angle is chosen to be close to, but less than the entrance angular aperture of the second optical system.

54. The method for microscopy, according to claim 46 further comprising one or more processes of subtraction of dark field images, subtraction of background images, shifting of spatial frequencies in accordance with the optical configuration, and elimination of one or more overlapping coverages of the frequency space wherein the elimination operations can be performed either in the optical systems or in the signal processing.

55. The method for microscopy, according to claim 46, further comprising selection of the regions of spatial frequency space to provide an image of the object in the object plane.

56. The method of claim 46, wherein providing the third optical system further comprises:

collecting a portion of the coherent illumination using a beamsplitter disposed in the optical path of the first optical system;

providing one or more optical components to direct the portion of the coherent illumination as the reference beam to illuminate the object plane at an angle less than the entrance angular aperture of the second collection optical system;

adjusting the angle of the reference beam transmitted by the object with reference to the acceptance angular aperture of the second collection optical system using a prism disposed between the object plane and the entrance aperture of the second optical system; and adjusting the tilt of the prism to alternately shift all of the diffracted beams incident on the second optical system such that the reference beam is alternately transmitted and blocked by the entrance aperture of the second optical system.

57. The method for microscopy, according to claim 46, wherein providing a third optical system comprises:

collecting a portion of the coherent illumination by splitting the coherent illumination using a beam splitter disposed in the optical path of the first optical system;

directing the portion of the coherent illumination as a reference beam to illuminate the object at an angle less than the entrance angular aperture of the second optical system using one or more optical components between the first optical system and the second optical system; and sequentially blocking and unblocking transmission of the reference beam using a guide-mode resonance filter disposed between the object and a collection lens of the second optical system.

58. The method of claim 57 wherein the angle is chosen to be close to, but less than the entrance angular aperture of the second optical system.

* * * * *